United States Patent
Ward

(10) Patent No.: US 11,292,261 B2
(45) Date of Patent: Apr. 5, 2022

(54) LOGIC CIRCUITRY PACKAGE

(71) Applicant: HEWLETT-PACKARD DEVELOPMENT COMPANY, L.P., Spring, TX (US)

(72) Inventor: Jefferson P. Ward, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 153 days.

(21) Appl. No.: 16/767,589

(22) PCT Filed: Dec. 3, 2019

(86) PCT No.: PCT/US2019/064196
§ 371 (c)(1),
(2) Date: May 27, 2020

(87) PCT Pub. No.: WO2020/117776
PCT Pub. Date: Jun. 11, 2020

(65) Prior Publication Data
US 2021/0213747 A1    Jul. 15, 2021

Related U.S. Application Data

(63) Continuation-in-part of application No. PCT/US2019/058116, filed on Oct. 25, 2019, and a
(Continued)

(51) Int. Cl.
B41J 2/175         (2006.01)
G06F 13/42        (2006.01)
G06F 21/44        (2013.01)

(52) U.S. Cl.
CPC ....... B41J 2/17546 (2013.01); B41J 2/17566 (2013.01); G06F 13/4282 (2013.01);
(Continued)

(58) Field of Classification Search
CPC .............. B41J 2/17546; B41J 2/17566; G06F 13/4282; G06F 13/4291; G06F 21/44
See application file for complete search history.

(56) References Cited

U.S. PATENT DOCUMENTS 4,074,284 A    2/1978 Dexter et al.
4,506,276 A    3/1985 Kyser et al.
(Continued)

FOREIGN PATENT DOCUMENTS

AU    2014202104 A1    5/2014
CA    2507422 A1       1/2002
(Continued)

OTHER PUBLICATIONS

Arnostech, "Thermal Inkjet Printers," http://www.arnostech.com/machines/coding-systems/thermal-inkjet-printers/, retrieved Jul. 1, 2019, 3 pgs.
(Continued)

*Primary Examiner* — Anh T Vo
(74) *Attorney, Agent, or Firm* — Dicke Billig & Czaja PLLC

(57) ABSTRACT

A logic circuitry package for a print apparatus component includes an interface to communicate with a print apparatus logic circuit, and at least one logic circuit. The at least one logic circuit is configured to receive, via the interface, a command series addressed to a first default address and a second default address, and transmit, via the interface, at least one response in response to at least one command of the command series. The at least one logic circuit is configured to receive, via the interface, an other command series addressed to an other first default address and subsequently, the second default address, and transmit, via the interface, at least one other response in response to at least one other command of the other command series.

23 Claims, 22 Drawing Sheets

| FIRST REPLACEABLE PRINT APPARATUS COMPONENT 902(1) | OTHER REPLACEABLE PRINT APPARATUS COMPONENT 902(2) | FURTHER REPLACEABLE PRINT APPARATUS COMPONENT 902(3) |
|---|---|---|
| FIRST DEFAULT ADDRESS 904(1) | OTHER FIRST DEFAULT ADDRESS 904(2) | FURTHER FIRST DEFAULT ADDRESS 904(3) |
| SECOND DEFAULT ADDRESS 906(1) | SECOND DEFAULT ADDRESS 906(2) | SECOND DEFAULT ADDRESS 906(3) |
| THIRD/RECONFIGURED/ TEMPORARY ADDRESS 908(1) | OTHER THIRD/RECONFIGURED/ TEMPORARY ADDRESS 908(2) | FURTHER THIRD/RECONFIGURED/ TEMPORARY ADDRESS 908(3) |

Related U.S. Application Data continuation-in-part of application No. PCT/US2019/058108, filed on Oct. 25, 2019, and a continuation-in-part of application No. PCT/US2019/026133, filed on Apr. 5, 2019, and a continuation-in-part of application No. PCT/US2019/026161, filed on Apr. 5, 2019, and a continuation-in-part of application No. PCT/US2019/026152, filed on Apr. 5, 2019, and a continuation-in-part of application No. PCT/US2018/063631, filed on Dec. 3, 2018.

(52) U.S. Cl.
CPC .......... *G06F 13/4291* (2013.01); *G06F 21/44* (2013.01); *G06F 2213/0016* (2013.01)

(56) References Cited

U.S. PATENT DOCUMENTS

| | | | |
|---|---|---|---|
| 4,639,738 A | 1/1987 | Young et al. | |
| 4,734,787 A | 3/1988 | Hayashi | |
| 5,001,596 A | 3/1991 | Hart | |
| 5,045,811 A | 9/1991 | Lewis | |
| 5,079,570 A | 1/1992 | Mohr et al. | |
| 5,142,909 A | 9/1992 | Baughman | |
| 5,329,254 A | 7/1994 | Takano | |
| 5,438,351 A | 8/1995 | Trenchard et al. | |
| 5,471,176 A | 11/1995 | James et al. | |
| 5,561,691 A * | 10/1996 | Weinraub | G06F 13/405 370/503 |
| 5,583,544 A | 12/1996 | Stamer et al. | |
| 5,680,960 A | 10/1997 | Keyes et al. | |
| 5,682,184 A | 10/1997 | Stephany et al. | |
| 5,699,091 A | 12/1997 | Bullock et al. | |
| 5,731,824 A | 3/1998 | Kneezel et al. | |
| 5,751,323 A | 5/1998 | Swanson | |
| 5,757,406 A | 5/1998 | Kaplinsky et al. | |
| 5,777,646 A | 7/1998 | Barinaga et al. | |
| 5,788,388 A | 8/1998 | Cowger et al. | |
| 5,861,780 A | 1/1999 | Fukuda | |
| 5,975,688 A | 11/1999 | Kanaya et al. | |
| 6,068,363 A | 5/2000 | Saito | |
| 6,098,457 A | 8/2000 | Poole | |
| 6,151,039 A | 11/2000 | Hmelar et al. | |
| 6,164,766 A | 12/2000 | Erickson | |
| 6,175,929 B1 | 1/2001 | Hsu et al. | |
| 6,219,933 B1 | 4/2001 | Taniguchi et al. | |
| 6,299,273 B1 | 10/2001 | Anderson et al. | |
| 6,312,074 B1 | 11/2001 | Walker | |
| 6,341,853 B1 | 1/2002 | Scheffelin et al. | |
| 6,386,693 B1 | 5/2002 | Michele | |
| 6,402,299 B1 | 6/2002 | DeMeerleer | |
| 6,412,901 B2 | 7/2002 | Su et al. | |
| 6,431,670 B1 | 8/2002 | Schantz et al. | |
| 6,456,802 B1 | 9/2002 | Phillips | |
| 6,457,355 B1 | 10/2002 | Philipp | |
| 6,494,553 B1 | 12/2002 | Donahue et al. | |
| 6,494,568 B2 | 12/2002 | Hou et al. | |
| 6,598,963 B1 | 7/2003 | Yamamoto et al. | |
| 6,641,240 B2 | 11/2003 | Hsu et al. | |
| 6,641,243 B2 | 11/2003 | Anderson et al. | |
| 6,648,434 B2 | 11/2003 | Walker et al. | |
| 6,685,290 B1 | 2/2004 | Farr et al. | |
| 6,736,497 B2 | 5/2004 | Jung | |
| 6,796,644 B1 | 9/2004 | Anderson, Jr. et al. | |
| 6,802,581 B2 | 10/2004 | Hasseler et al. | |
| 6,802,602 B2 | 10/2004 | Sakai et al. | |
| 6,811,250 B2 | 11/2004 | Buchanan et al. | |
| 6,902,256 B2 | 6/2005 | Anderson et al. | |
| 6,908,179 B2 | 6/2005 | Pan et al. | |
| 6,959,599 B2 | 11/2005 | Feldstein et al. | |
| 6,966,222 B2 | 11/2005 | Carson et al. | |
| 6,969,137 B2 | 11/2005 | Maeda | |
| 7,039,734 B2 | 5/2006 | Sun et al. | |
| 7,077,506 B2 | 7/2006 | Chen | |
| 7,171,323 B2 | 1/2007 | Shipton et al. | |
| 7,240,130 B2 | 7/2007 | Larson | |
| 7,260,662 B2 | 8/2007 | Moriwaki et al. | |
| 7,328,115 B2 | 2/2008 | Shipton et al. | |
| 7,380,042 B2 | 5/2008 | Wang et al. | |
| 7,458,656 B2 | 12/2008 | Smith | |
| 7,533,960 B2 | 5/2009 | Yasuda et al. | |
| 7,547,082 B2 | 6/2009 | Lee et al. | |
| 7,630,304 B2 | 12/2009 | Larson et al. | |
| 7,686,423 B2 | 3/2010 | Sato et al. | |
| 7,740,347 B2 | 6/2010 | Silverbrook et al. | |
| 7,775,638 B2 | 8/2010 | Hirosawa et al. | |
| 7,841,712 B2 | 11/2010 | Muyskens et al. | |
| 7,886,197 B2 | 2/2011 | Wegman | |
| 7,890,690 B2 | 2/2011 | Naderi et al. | |
| 7,970,042 B2 | 6/2011 | Lexmark | |
| 8,040,215 B2 | 10/2011 | Zakriti | |
| 8,161,224 B2 | 4/2012 | Laurencin et al. | |
| 8,215,018 B2 | 7/2012 | Morita et al. | |
| 8,220,910 B2 | 7/2012 | Wanibe | |
| 8,224,602 B2 | 7/2012 | Lory et al. | |
| 8,289,788 B2 | 10/2012 | Asauchi | |
| 8,331,581 B2 | 12/2012 | Pennock | |
| 8,348,377 B2 | 1/2013 | Asauchi | |
| 8,350,628 B1 | 1/2013 | George et al. | |
| 8,364,859 B2 | 1/2013 | Sato | |
| 8,386,657 B2 | 2/2013 | Adkins et al. | |
| 8,393,718 B2 | 3/2013 | Kida et al. | |
| 8,393,721 B2 | 3/2013 | Katoh et al. | |
| 8,429,437 B2 | 4/2013 | Asauchi | |
| 8,432,421 B2 | 4/2013 | Muraki et al. | |
| 8,438,919 B2 | 5/2013 | Phillips et al. | |
| 8,454,137 B2 | 6/2013 | Price et al. | |
| 8,556,394 B2 | 10/2013 | Chen | |
| 8,558,577 B1 | 10/2013 | Soriano Fosas et al. | |
| 8,562,091 B2 | 10/2013 | Sabanovic et al. | |
| 8,591,012 B2 | 11/2013 | Yoshino et al. | |
| 8,608,276 B2 | 12/2013 | Oohashi et al. | |
| 8,621,116 B2 | 12/2013 | Fister et al. | |
| 8,651,614 B2 | 2/2014 | Sakamoto et al. | |
| 8,651,643 B2 | 2/2014 | Harvey et al. | |
| 8,721,059 B2 | 5/2014 | Kodama et al. | |
| 8,721,203 B2 | 5/2014 | Ehrhardt, Jr. | |
| 8,752,943 B2 | 6/2014 | Hirano et al. | |
| 8,864,277 B2 * | 10/2014 | Rice | G06F 21/44 347/19 |
| 8,876,257 B2 | 11/2014 | Harada et al. | |
| 8,888,207 B2 | 11/2014 | Furness, III et al. | |
| 8,892,798 B2 | 11/2014 | Tailliet et al. | |
| 8,898,358 B2 | 11/2014 | DeCesaris et al. | |
| 8,978,487 B2 | 3/2015 | Fergusson et al. | |
| 8,990,467 B2 | 3/2015 | Saito | |
| 9,079,414 B2 | 7/2015 | Lester et al. | |
| 9,108,448 B1 | 8/2015 | Bergstedt | |
| 9,132,656 B2 | 9/2015 | Nicholson, III et al. | |
| 9,137,093 B1 | 9/2015 | Abraham et al. | |
| 9,176,921 B2 | 11/2015 | Fister et al. | |
| 9,213,396 B1 | 12/2015 | Booth et al. | |
| 9,213,927 B1 | 12/2015 | Ahne et al. | |
| 9,254,661 B2 | 2/2016 | Otaka et al. | |
| 9,298,908 B1 | 3/2016 | Booth et al. | |
| 9,370,934 B2 | 6/2016 | Asauchi et al. | |
| 9,400,204 B2 | 7/2016 | Schoenberg | |
| 9,413,356 B1 | 8/2016 | McKinley | |
| 9,413,359 B2 | 8/2016 | Stirk | |
| 9,454,504 B2 | 9/2016 | Evans | |
| 9,483,003 B2 | 11/2016 | Thacker, III | |
| 9,487,017 B2 | 11/2016 | Ge et al. | |
| 9,496,884 B1 | 11/2016 | Azenkot et al. | |
| 9,511,596 B2 | 12/2016 | Anderson et al. | |
| 9,561,662 B2 | 2/2017 | Ward et al. | |
| 9,582,443 B1 | 2/2017 | Switzer et al. | |
| 9,599,500 B2 | 3/2017 | Ge et al. | |
| 9,619,663 B2 | 4/2017 | Refstrup | |
| 9,671,820 B2 | 6/2017 | Maruyama et al. | |
| 9,734,121 B2 | 8/2017 | Pitigoi-Aron et al. | |
| 9,738,087 B2 | 8/2017 | Kato et al. | |
| 9,746,799 B2 | 8/2017 | Jeran | |
| 9,770,914 B2 | 9/2017 | Harvey et al. | |

(56) References Cited

U.S. PATENT DOCUMENTS

| | | |
|---|---|---|
| 9,776,412 B2 | 10/2017 | Ge et al. |
| 9,789,697 B1 | 10/2017 | Knierim et al. |
| 9,796,178 B2 | 10/2017 | Maxfield |
| 9,852,282 B2 | 12/2017 | Jeran et al. |
| 9,876,794 B2 | 1/2018 | Adkins et al. |
| 9,895,917 B2 | 2/2018 | Corvese et al. |
| 9,914,306 B2 | 3/2018 | Jeran |
| 9,922,276 B2 | 3/2018 | Fister et al. |
| 9,994,036 B2 | 6/2018 | Angulo Navarro et al. |
| 10,031,882 B2 | 7/2018 | Srivastava et al. |
| 10,052,878 B2 | 8/2018 | Benneton |
| 10,107,667 B2 | 10/2018 | Cumbie et al. |
| 10,146,608 B2 | 12/2018 | Giovannini et al. |
| 10,155,379 B2 | 12/2018 | Ng et al. |
| 10,214,018 B2 | 2/2019 | Nozawa et al. |
| 10,214,019 B2 | 2/2019 | Campbell-Brown et al. |
| 10,259,230 B2 | 4/2019 | Asauchi |
| 10,279,594 B2 | 5/2019 | Horade |
| 10,338,838 B2 | 7/2019 | Olarig |
| 10,471,725 B2 | 11/2019 | Esterberg et al. |
| 10,875,318 B1 | 12/2020 | Gardner et al. |
| 10,894,423 B2 | 1/2021 | Gardner et al. |
| 11,034,157 B2 | 6/2021 | Gardner et al. |
| 2001/0029554 A1 | 10/2001 | Namba |
| 2001/0033316 A1 | 10/2001 | Eida |
| 2002/0012016 A1 | 1/2002 | Wilson et al. |
| 2002/0012616 A1 | 1/2002 | Zhou et al. |
| 2002/0033855 A1 | 3/2002 | Kubota et al. |
| 2002/0109761 A1 | 8/2002 | Shimizu et al. |
| 2002/0129650 A1 | 9/2002 | Zimmermann |
| 2002/0154181 A1 | 10/2002 | Kubota et al. |
| 2003/0009595 A1 | 1/2003 | Collins |
| 2003/0018300 A1 | 1/2003 | Duchon et al. |
| 2003/0071862 A1 | 4/2003 | Tsukada et al. |
| 2003/0202024 A1 | 10/2003 | Corrigan |
| 2004/0021711 A1 | 2/2004 | Hasseler |
| 2004/0036733 A1 | 2/2004 | Kubota et al. |
| 2004/0085382 A1 | 5/2004 | Kosugi et al. |
| 2004/0155913 A1 | 8/2004 | Kosugi et al. |
| 2004/0252146 A1 | 12/2004 | Naka et al. |
| 2005/0010910 A1 | 1/2005 | Lindhorst et al. |
| 2005/0093910 A1 | 5/2005 | Im |
| 2005/0125105 A1 | 6/2005 | Halstead et al. |
| 2005/0126282 A1 | 6/2005 | Maatuk |
| 2005/0185595 A1 | 8/2005 | Lee |
| 2005/0229699 A1 | 10/2005 | Chai et al. |
| 2006/0007253 A1 | 1/2006 | Kosugi |
| 2006/0007295 A1 | 1/2006 | Ueda |
| 2006/0072952 A1 | 4/2006 | Walmsley |
| 2006/0110199 A1 | 5/2006 | Walmsley et al. |
| 2006/0181583 A1 | 8/2006 | Usuda |
| 2006/0181719 A1 | 8/2006 | Aoki et al. |
| 2006/0221386 A1 | 10/2006 | Brooks et al. |
| 2006/0244795 A1 | 11/2006 | Hayasaki et al. |
| 2006/0268030 A1 | 11/2006 | Walmsley et al. |
| 2006/0274103 A1 | 12/2006 | Kim |
| 2006/0290723 A1 | 12/2006 | Jeong et al. |
| 2007/0024650 A1 | 2/2007 | Reinten et al. |
| 2007/0068249 A1 | 3/2007 | Eguchi et al. |
| 2007/0088816 A1 | 4/2007 | Hrustemovic et al. |
| 2007/0115307 A1 | 5/2007 | Smith |
| 2007/0146409 A1 | 6/2007 | Kubota et al. |
| 2007/0247497 A1 | 10/2007 | Buchanan et al. |
| 2008/0024555 A1 | 1/2008 | Kimura |
| 2008/0041152 A1 | 2/2008 | Schoenberg |
| 2008/0107151 A1 | 5/2008 | Khadkikar et al. |
| 2008/0129779 A1 | 6/2008 | Walmsley et al. |
| 2008/0143476 A1 | 6/2008 | Cheung et al. |
| 2008/0165232 A1 | 7/2008 | Yuen |
| 2008/0192074 A1 | 8/2008 | Dubois et al. |
| 2008/0211838 A1 | 9/2008 | Zhang |
| 2008/0246626 A1 | 10/2008 | Sheafor et al. |
| 2008/0298455 A1 | 12/2008 | Ilia et al. |
| 2008/0307134 A1 | 12/2008 | Geissler et al. |
| 2009/0013779 A1 | 1/2009 | Usui |
| 2009/0021766 A1 | 1/2009 | Yamazaki |
| 2009/0177823 A1 | 7/2009 | Chao |
| 2009/0179678 A1 | 7/2009 | Hardin |
| 2009/0290005 A1 | 11/2009 | Wanibe |
| 2009/0309941 A1 | 12/2009 | Price |
| 2010/0082271 A1 | 4/2010 | McCann et al. |
| 2010/0138745 A1 | 6/2010 | McNamara |
| 2010/0205350 A1 | 8/2010 | Bryant-Rich |
| 2010/0220128 A1 | 9/2010 | Zaba |
| 2010/0248208 A1 | 9/2010 | Okubo et al. |
| 2010/0254202 A1 | 10/2010 | Asauchi |
| 2010/0257327 A1 | 10/2010 | Kosugi |
| 2010/0306431 A1 | 12/2010 | Adkins et al. |
| 2011/0009938 A1 | 1/2011 | Dowling |
| 2011/0029705 A1 | 2/2011 | Evans |
| 2011/0050793 A1 | 3/2011 | Kumagai et al. |
| 2011/0087914 A1 | 4/2011 | Files et al. |
| 2011/0113171 A1 | 5/2011 | Radhakrishnan et al. |
| 2011/0131441 A1 | 6/2011 | Asauchi |
| 2011/0279530 A1 | 11/2011 | Love |
| 2011/0285027 A1 | 11/2011 | Lee |
| 2012/0128379 A1 | 5/2012 | Takeda |
| 2012/0243559 A1 | 9/2012 | Pan et al. |
| 2012/0284429 A1 | 11/2012 | Adkins et al. |
| 2012/0299989 A1 | 11/2012 | Prothon |
| 2013/0018513 A1 | 1/2013 | Metselaar |
| 2013/0054933 A1 | 2/2013 | Fister |
| 2013/0067015 A1 | 3/2013 | Vasters |
| 2013/0067016 A1 | 3/2013 | Adkins |
| 2013/0155142 A1 | 6/2013 | Browning et al. |
| 2013/0250024 A1 | 9/2013 | Kakishima |
| 2013/0295245 A1 | 11/2013 | Gardner |
| 2014/0040517 A1 | 2/2014 | Fister et al. |
| 2014/0095750 A1 | 4/2014 | Tailliet |
| 2014/0164660 A1 | 6/2014 | DeCesaris et al. |
| 2014/0211241 A1 | 7/2014 | Rice et al. |
| 2014/0260520 A1 | 9/2014 | Schoenberg |
| 2014/0265049 A1 | 9/2014 | Burris et al. |
| 2014/0337553 A1 | 11/2014 | Du et al. |
| 2014/0351469 A1 | 11/2014 | Fister et al. |
| 2014/0354729 A1 | 12/2014 | Vanbrocklin et al. |
| 2014/0372652 A1 | 12/2014 | Shu |
| 2014/0375321 A1 | 12/2014 | Ikeya |
| 2014/0375730 A1 | 12/2014 | Campbell-Brown |
| 2015/0028671 A1 | 1/2015 | Ragaini et al. |
| 2015/0052996 A1 | 2/2015 | Niemann |
| 2015/0074304 A1 | 3/2015 | Adkins et al. |
| 2015/0089630 A1 | 3/2015 | Lee |
| 2015/0239254 A1 | 8/2015 | Muyskens et al. |
| 2015/0285526 A1 | 10/2015 | Smith et al. |
| 2015/0343792 A1 | 12/2015 | Refstrup |
| 2016/0055402 A1 | 2/2016 | Fister et al. |
| 2016/0098359 A1 | 4/2016 | Adkins et al. |
| 2016/0110535 A1 | 4/2016 | Booth et al. |
| 2016/0114590 A1 | 4/2016 | Arpin |
| 2016/0279962 A1 | 9/2016 | Ishida et al. |
| 2016/0357691 A1 | 12/2016 | Ahne |
| 2016/0364305 A1 | 12/2016 | Pitigou-Aron |
| 2016/0368273 A1 | 12/2016 | Ishikawa |
| 2017/0032135 A1 | 2/2017 | Refstrup |
| 2017/0050383 A1 | 2/2017 | Bell et al. |
| 2017/0100941 A1 | 4/2017 | Kuribayashi |
| 2017/0144448 A1 | 5/2017 | Smith |
| 2017/0157929 A1 | 6/2017 | Yokoo et al. |
| 2017/0168976 A1 | 6/2017 | Yost et al. |
| 2017/0169623 A1 | 6/2017 | Chen et al. |
| 2017/0182786 A1 | 6/2017 | Angulo Navarro |
| 2017/0189011 A1 | 7/2017 | Stone et al. |
| 2017/0194913 A1 | 7/2017 | Wilson et al. |
| 2017/0230540 A1 | 8/2017 | Sasaki |
| 2017/0330449 A1 | 11/2017 | Lunardhi |
| 2018/0050537 A1 | 2/2018 | Bakker et al. |
| 2018/0100753 A1 | 4/2018 | Cumbie et al. |
| 2018/0143935 A1 | 5/2018 | Cox |
| 2018/0157943 A1 | 6/2018 | Fister et al. |
| 2018/0162137 A1 | 6/2018 | Van Brocklin et al. |
| 2018/0212593 A1 | 7/2018 | Usuda |
| 2018/0264808 A1 | 9/2018 | Bakker et al. |
| 2018/0281394 A1 | 10/2018 | Horade et al. |

(56) References Cited

U.S. PATENT DOCUMENTS

| | | | |
|---|---|---|---|
| 2018/0281438 A1 | 10/2018 | Horade | |
| 2018/0290457 A1 | 10/2018 | Ge et al. | |
| 2018/0302110 A1 | 10/2018 | Solan | |
| 2018/0304640 A1 | 10/2018 | Horne | |
| 2019/0004991 A1 | 1/2019 | Foust | |
| 2019/0011306 A1 | 1/2019 | Cumbie et al. | |
| 2019/0012663 A1 | 1/2019 | Masters | |
| 2019/0013731 A1 | 1/2019 | Gritti | |
| 2019/0023020 A1 | 1/2019 | Anderson | |
| 2019/0061347 A1 | 2/2019 | Bakker et al. | |
| 2019/0064408 A1 | 2/2019 | Smit | |
| 2019/0097785 A1 | 3/2019 | Elenes | |
| 2019/0111694 A1 | 4/2019 | Cumbie et al. | |
| 2019/0111695 A1 | 4/2019 | Anderson et al. | |
| 2019/0111696 A1 | 4/2019 | Anderson et al. | |
| 2019/0118527 A1 | 4/2019 | Anderson et al. | |
| 2019/0126631 A1 | 5/2019 | Anderson et al. | |
| 2019/0137316 A1 | 5/2019 | Anderson et al. | |
| 2019/0138484 A1 | 5/2019 | De Santiago Dominguez et al. | |
| 2019/0217628 A1 | 7/2019 | Horade et al. | |
| 2019/0226930 A1 | 7/2019 | Cumbie et al. | |
| 2019/0240985 A1 | 8/2019 | Ge et al. | |
| 2020/0159689 A1 | 5/2020 | Koshisaka et al. | |
| 2021/0334392 A1 | 10/2021 | Panshin et al. | |

FOREIGN PATENT DOCUMENTS

| | | |
|---|---|---|
| CN | 2603934 Y | 2/2004 |
| CN | 2734479 Y | 10/2005 |
| CN | 201761148 U | 3/2011 |
| CN | 102231054 A | 11/2011 |
| CN | 203651218 U | 6/2014 |
| CN | 102736627 B | 12/2014 |
| CN | 103879149 B | 6/2015 |
| CN | 105760318 A | 7/2016 |
| CN | 107209743 A | 9/2017 |
| CN | 108819486 A | 11/2018 |
| CN | 209014461 U | 6/2019 |
| DE | 3712699 A1 | 11/1988 |
| EP | 0015954 B1 | 6/1984 |
| EP | 0720916 A2 | 7/1996 |
| EP | 0994779 A1 | 4/2000 |
| EP | 1164022 A2 | 12/2001 |
| EP | 1238811 A1 | 9/2002 |
| EP | 1285764 A1 | 2/2003 |
| EP | 1314565 A2 | 5/2003 |
| EP | 1389531 A1 | 2/2004 |
| EP | 1524120 A2 | 4/2005 |
| EP | 1800872 A1 | 6/2007 |
| EP | 1839872 A1 | 10/2007 |
| EP | 2237163 A1 | 10/2010 |
| EP | 2385468 A1 | 11/2011 |
| EP | 2854063 A1 | 4/2015 |
| EP | 3208736 A1 | 8/2017 |
| GB | 2519181 A | 4/2015 |
| JP | H04220353 A | 8/1992 |
| JP | 2001292133 A | 10/2001 |
| JP | 2002026471 A | 1/2002 |
| JP | 2003326726 A | 11/2003 |
| JP | 2005262458 A | 9/2005 |
| JP | 2009258604 A | 11/2009 |
| JP | 2010079199 A | 4/2010 |
| JP | 2011113336 A | 6/2011 |
| JP | 2012063770 A | 3/2012 |
| JP | 2013197677 A | 9/2013 |
| JP | 5644052 B2 | 12/2014 |
| JP | 2014534917 A | 12/2014 |
| JP | 2016185664 A | 10/2016 |
| JP | 2017196842 A | 11/2017 |
| JP | 2018049141 A | 3/2018 |
| JP | 2018136774 A | 8/2018 |
| JP | 2018161785 A | 10/2018 |
| JP | 2018531394 A | 10/2018 |
| KR | 20080003539 A | 1/2008 |
| KR | 101785051 B1 | 10/2017 |
| TW | 200707209 A | 2/2007 |
| TW | 201202948 A | 1/2012 |
| TW | 201546620 A | 12/2015 |
| WO | WO-2007107957 A1 | 9/2007 |
| WO | WO-2008117194 A1 | 10/2008 |
| WO | WO-2009145774 A1 | 12/2009 |
| WO | WO-2012020443 A8 | 2/2012 |
| WO | WO-2012054050 A1 | 4/2012 |
| WO | WO-2012057755 A1 | 5/2012 |
| WO | WO-2013048430 A1 | 4/2013 |
| WO | WO-2015116092 A1 | 8/2015 |
| WO | WO-2016061480 A2 | 4/2016 |
| WO | WO-2016114759 A1 | 7/2016 |
| WO | WO-2016130157 A1 | 8/2016 |
| WO | WO-2017074334 A1 | 5/2017 |
| WO | WO-2017074342 A1 | 5/2017 |
| WO | WO-2017174363 A1 | 10/2017 |
| WO | WO-2017184147 A1 | 10/2017 |
| WO | WO-2017189009 A1 | 11/2017 |
| WO | WO-2017189010 A1 | 11/2017 |
| WO | WO-2017189011 A1 | 11/2017 |
| WO | WO-2017189013 A1 | 11/2017 |
| WO | WO-2018017066 A1 | 1/2018 |
| WO | WO-2018022038 A1 | 2/2018 |
| WO | WO-2018186847 A1 | 10/2018 |
| WO | WO-2018199886 A1 | 11/2018 |
| WO | WO-2018199891 A1 | 11/2018 |
| WO | WO-2018199895 A1 | 11/2018 |
| WO | WO-2018217185 A1 | 11/2018 |
| WO | WO-2019017963 A1 | 1/2019 |
| WO | WO-2019078834 A1 | 4/2019 |
| WO | WO-2019078835 A1 | 4/2019 |
| WO | WO-2019078839 A1 | 4/2019 |
| WO | WO-2019078840 A1 | 4/2019 |
| WO | WO-2019078843 A1 | 4/2019 |
| WO | WO-2019078844 A1 | 4/2019 |
| WO | WO-2019078845 A1 | 4/2019 |

OTHER PUBLICATIONS

Epson, "Epson Provides the Best Inks for the Job," https://www.epson.co.nz/microsite/excellence/inks_why.asp, retrieved Jul. 1, 2019, 3 pgs.

Platform Development Team, "Development of the HP DeskJet 1200C Print Cartridge Platform," Hewlett-Packard Journal, Feb. 1994, pp. 46-54.

International Searching Authority, "International Search Report and Written Opinion," issued in connection with PCT/US2019/026159, dated Aug. 13, 2019, 15 pgs.

International Searching Authority, "International Search Report and Written Opinion," issued in connection with PCT/US2018/063624, dated Aug. 23, 2019, 13 pgs.

International Searching Authority, "International Search Report and Written Opinion," issued in connection with PCT/US2018/063630, dated Aug. 22, 2019, 15 pgs.

International Searching Authority, "International Search Report and Written Opinion," issued in connection with PCT/US2018/063633, dated Jul. 23, 2019, 12 pgs.

International Searching Authority, "International Search Report and Written Opinion," issued in connection with PCT/US2018/063638, dated Aug. 26, 2019, 13 pgs.

International Searching Authority, "International Search Report and Written Opinion," issued in connection with PCT/US2018/063643, dated Aug. 20, 2019, 13 pgs.

International Searching Authority, "International Search Report and Written Opinion," issued in connection with PCT/US2019/017511, dated Jul. 25, 2019, 12 pgs.

International Searching Authority, "International Search Report and Written Opinion," issued in connection with PCT/US2019/026124, dated Aug. 26, 2019, 15 pgs.

International Searching Authority, "International Search Report and Written Opinion," issued in connection with PCT/US2019/026133, dated Aug. 26, 2019, 18 pgs.

International Searching Authority, "International Search Report and Written Opinion," issued in connection with PCT/US2019/026145, dated Sep. 5, 2019, 16 pgs.

(56) References Cited

OTHER PUBLICATIONS

International Searching Authority, "International Search Report and Written Opinion," issued in connection with PCT/US2019/026161, dated Aug. 26, 2019, 20 pgs.

International Searching Authority, "International Search Report and Written Opinion," issued in connection with PCT/US2018/063631, dated Aug. 23, 2019, 13 pgs.

Maxim Integrated Products, "1-to-8 I2C Bus Switches/Multiplexers with Bus Lock-up Detection, Isolation, and Notification," Sep. 2008, 22 pgs.

NXP, "Introducing A10006 Secure Authenticator Tamper-Resistant Anti Counterfeit Solution", retreived Jul. 3, 2019, 29 pgs.

NXP B.V., "NXP 2-, 4-, and 8-Channel I2C/SMBus Muxes and Switches PCA954x," Jul. 2008, 4 pgs.

NXP Semiconductors N.V., "PCA9641: 2-Channel I2C-Bus Master Arbiter," Oct. 27, 2015, 55 pgs.

Laureto, John et al., "Open Source Multi-Head 3D Printer for Polymer-Metal Composite Component Manufacturing," Technologies, MDPI, 2017, 5 (2), pp. 36, 23 pgs.

NXP Semiconductors N.V., "PCA9547: 8-Channel I2C-Bus Multiplexer with Reset," Apr. 1, 2014, 34 pgs.

NXP Semiconductors N.V., "An 11593: How to Design in and Program the PCA9641 I2C Arbiter," Oct. 23, 2014, 22 pgs.

Reddit, "Use an Accelerometer to Measure Z wobble", retrieved Jul. 1, 2019, 3 pgs, https://www.reddit.com/r/Reprap/comments/6qsoyd/use_an_accelerometer_to_measure_z_wobble/.

Phillips Semiconductors, "The I2C-Bus Specification", Version 2.1, Jan. 2000, 46 pgs.

United States Patent and Trademark Office, "Non-Final Office Action," issued in connection with U.S. Appl. No. 16/502,479, dated Dec. 11, 2019, 13 pgs.

United States Patent and Trademark Office, "Non-Final Office Action," issued in connection with U.S. Appl. No. 16/460,016, dated Sep. 12, 2019, 12 pgs.

United States Patent and Trademark Office, "Non-Final Office Action," issued in connection with U.S. Appl. No. 16/505,090, dated Sep. 10, 2019, 20 pgs.

United States Patent and Trademark Office, "Notice of Allowance," issued in connection with U.S. Appl. No. 16/502,479, dated Apr. 9, 2020, 9 pgs.

United States Patent and Trademark Office, "Notice of Allowance," issued in connection with U.S. Appl. No. 16/460,016, dated Mar. 25, 2020, 10 pgs.

United States Patent and Trademark Office, "Notice of Allowance," issued in connection with U.S. Appl. No. 16/505,090, dated Feb. 12, 2020, 9 pgs.

United States Patent and Trademark Office, "Notice of Allowance," issued in connection with U.S. Appl. No. 16/505,090, dated Oct. 22, 2019, 5 pgs.

United States Patent and Trademark Office, "Notice of Allowance," issued in connection with U.S. Appl. No. 16/728,207, dated Feb. 19, 2020, 19 pgs.

United States Patent and Trademark Office, "Restriction Requirement," issued in connection with U.S. Appl. No. 16/502,479, dated Aug. 15, 2019, 7 pgs.

* cited by examiner

| FIRST REPLACEABLE PRINT APPARATUS COMPONENT 902(1) | OTHER REPLACEABLE PRINT APPARATUS COMPONENT 902(2) | FURTHER REPLACEABLE PRINT APPARATUS COMPONENT 902(3) |
|---|---|---|
| FIRST DEFAULT ADDRESS 904(1) | OTHER FIRST DEFAULT ADDRESS 904(2) | FURTHER FIRST DEFAULT ADDRESS 904(3) |
| SECOND DEFAULT ADDRESS 906(1) | SECOND DEFAULT ADDRESS 906(2) | SECOND DEFAULT ADDRESS 906(3) |
| THIRD/RECONFIGURED/ TEMPORARY ADDRESS 908(1) | OTHER THIRD/RECONFIGURED/ TEMPORARY ADDRESS 908(2) | FURTHER THIRD/RECONFIGURED/ TEMPORARY ADDRESS 908(3) |

Fig. 8

LOGIC CIRCUITRY PACKAGE

CROSS REFERENCE TO RELATED APPLICATIONS

This application is a U.S. National Stage Application of PCT Application No. PCT/US2019/64196, filed Dec. 3, 2019, entitled "LOGIC CIRCUITRY PACKAGE," which claims priority to PCT Application No. PCT/US2019/058108, filed Oct. 25, 2019, entitled "LOGIC CIRCUITRY PACKAGE"; PCT Application No. PCT/US2019/058116, filed Oct. 25, 2019, entitled "LOGIC CIRCUITRY PACKAGE"; PCT Application No. PCT/US2019/026133, filed Apr. 5, 2019, entitled "LOGIC CIRCUITRY"; PCT Application No. PCT/US2019/026152, filed Apr. 5, 2019, entitled "FLUID PROPERTY SENSOR"; PCT Application No. PCT/US2019/026161, filed Apr. 5, 2019, entitled "LOGIC CIRCUITRY"; and PCT Application No. PCT/US2018/063631, filed Dec. 3, 2018, entitled "LOGIC CIRCUITRY"; all of which are incorporated herein by reference.

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analog communications may be used.

Some two-dimensional (2D) and three-dimensional (3D) printing systems include one or more replaceable print apparatus components, such as print material containers (e.g., inkjet cartridges, toner cartridges, ink supplies, 3D printing agent supplies, build material supplies etc.), inkjet printhead assemblies, and the like. In some examples, logic circuitry associated with the replaceable print apparatus component(s) communicate with logic circuitry of the print apparatus in which they are installed, for example communicating information such as their identity, capabilities, status and the like. In further examples, print material containers may include circuitry to execute one or more monitoring functions such as print material level sensing.

BRIEF DESCRIPTION OF THE DRAWINGS

FIG. 8 illustrates a table of example address names for multiple replaceable print apparatus components.

DETAILED DESCRIPTION

Figure 1:
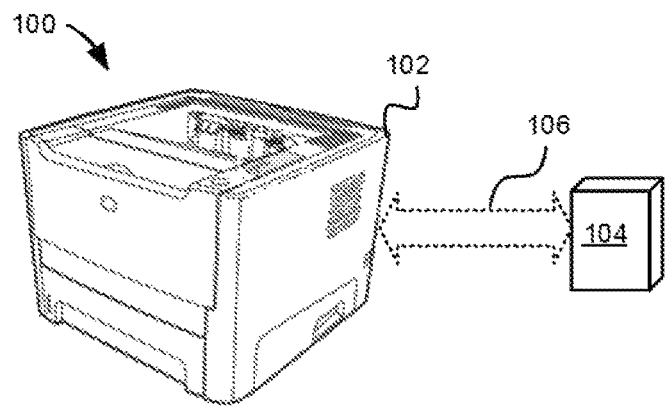
FIG. 1 illustrates one example of a printing system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Some examples of applications described herein are in the context of print apparatus. Not all the examples, however, are limited to such applications, and at least some of the principles set out herein may be used in other contexts. The contents of other applications and patents cited in this disclosure are incorporated by reference.

In certain examples, Inter-integrated Circuit ($I^2C$, or I2C, which notation is adopted herein) protocol allows at least one 'master' integrated circuit (IC) to communicate with at least one 'slave' IC, for example via a bus. I2C, and other communications protocols, communicate data according to a clock period. For example, a voltage signal may be generated, where the value of the voltage is associated with data. For example, a voltage value above X volts may indicate a logic "1" whereas a voltage value below X volts may indicate a logic "0", where X is a predetermined numerical value. By generating an appropriate voltage in each of a series of clock periods, data can be communicated via a bus or another communication link.

Certain example print material containers have slave logic that utilize I2C communications, although in other examples, other forms of digital or analog communications could also be used. In the example of I2C communication, a master IC may generally be provided as part of the print apparatus (which may be referred to as the 'host') and a replaceable print apparatus component would comprise a 'slave' IC, although this need not be the case in all examples. There may be a plurality of slave ICs connected to an I2C communication link or bus (for example, containers of different colors of print agent). The slave IC(s) may include a processor to perform data operations before responding to requests from logic circuitry of the print system.

Communications between print apparatus and replaceable print apparatus components installed in the apparatus (and/or the respective logic circuitry thereof) may facilitate various functions. Logic circuitry within a print apparatus may receive information from logic circuitry associated with a replaceable print apparatus component via a communications interface, and/or may send commands to the replaceable print apparatus component logic circuitry, which may include commands to write data to a memory associated therewith, or to read data therefrom.

One example of logic circuitry associated with replaceable print apparatus components may include leader logic circuitry in a leader supply, and follower logic circuitry in each of a plurality of follower supplies. The leader logic circuitry includes a sensor installed within the fluid containing portion of the leader supply. The leader logic circuitry receives, via an I2C bus, a request from a print apparatus logic circuit to provide sensor information from the sensor. The leader logic circuitry provides a response to the request, via the I2C bus, to the print apparatus logic circuit. The follower logic circuitry for each of the follower supplies monitors the response from the leader logic circuitry (e.g., via the I2C bus), or receives the response from the leader logic circuitry (e.g., via another communication channel), and when the follower logic circuitry receives a request from the print apparatus logic circuit to provide sensor information, the follower logic circuitry responds with the same response or a similar response as the leader logic circuitry. In some examples, the leader logic circuitry pushes information to the follower logic circuitry, and the follower logic circuitry responds to the print apparatus logic circuit based on the pushed information.

Another example of logic circuitry associated with a replaceable print apparatus component may include a logic circuit that monitors an I2C bus for commands directed to I2C addresses other than its own address, as well as responses to those commands. In response to commands directed to the I2C address of the logic circuit, the logic circuit may mimic previously monitored responses (e.g., store and repeat), or provide a pre-stored response sequence upon detecting a specific command (e.g., a prime command). The logic circuit may also monitor the timing of responses from other components, and repeat that timing in responses provided by the logic circuit.

Another example of logic circuitry associated with a replaceable print apparatus component may include a logic circuit that responds to commands directed to the replaceable print apparatus component, and responds to commands directed to at least one other replaceable print apparatus component. In some examples, the at least one other replaceable print apparatus component does not include any sensors or electronic chips.

Another example of logic circuitry associated with a replaceable print apparatus component may include a logic circuit that monitors an I2C bus for commands directed to a replaceable print apparatus component having a sensor, as well as responses to those commands. In response to commands directed to the logic circuit, and in response to commands directed to at least one further replaceable print apparatus component, the logic circuit copies monitored responses from the replaceable print apparatus component with the sensor.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one logic circuit, or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples, the package may be directly affixed to a cartridge wall. In some examples, the package may include an interface, for example including pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface. Where more than one logic circuit is provided, these logic circuits may be connected to each other or to the interface, to communicate through the same interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component. A logic circuitry package may alternatively be referred to as a logic circuitry assembly, or simply as logic circuitry or processing circuitry.

In some examples, the logic circuitry package may respond to various types of requests (or commands) from a host (e.g., a print apparatus). A first type of request may include a request for data, for example identification and/or authentication information. A second type of request from a host may be a request to perform a physical action, such as performing at least one measurement. A third type of request may be a request for a data processing action. There may be additional types of requests.

In some examples, there may be more than one address associated with a particular logic circuitry package, which is used to address communications sent over a bus to identify the logic circuitry package which is the target of a communication (and therefore, in some examples, with a replaceable print apparatus component). In some examples, different requests are handled by different logic circuits of the package. In some examples, the different logic circuits may be associated with different addresses. For example, cryptographically authenticated communications may be associated with secure microcontroller functions and a first I2C address, while other communications may be associated with a sensor circuit and a second and/or reconfigured I2C address. In certain examples, these other communications via the second and/or reconfigured address can be scrambled or otherwise secured, not using the encryption key used for the secure microcontroller functions. In one example, the communications to the different address are processed and transmitted by a single logic circuit.

In some examples, a plurality of such logic circuitry packages (each of which may be associated with a different replaceable print apparatus component) may be connected to an I2C bus. In some examples, at least one address of the logic circuitry package may be an I2C compatible address (herein after, an I2C address), for example in accordance with an I2C protocol, to facilitate directing communications between master to slaves in accordance with the I2C protocol. In other examples, other forms of digital and/or analog communication can be used.

FIG. 1 illustrates one example of a printing system 100. The printing system 100 includes a print apparatus 102 in communication with logic circuitry associated with a replaceable print apparatus component 104 via a communications link 106. In some examples, the communications link 106 may include an I2C capable or compatible bus (herein after, an I2C bus). Although for clarity, the replaceable print apparatus component 104 is shown as external to the print apparatus 102, in some examples, the replaceable print apparatus component 104 may be housed within the print apparatus.

The replaceable print apparatus component 104 may include, for example, a print material container or cartridge (which could be a build material container for 3D printing, a liquid or dry toner container for 2D printing, or an ink or liquid print agent container for 2D or 3D printing), which may in some examples include a print head or other dispensing or transfer component. The replaceable print apparatus component 104 may, for example, contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example including print agent containers of different colors, print heads (which may be integral to the containers), or the like. In other examples, the print apparatus components 104 could include service components, for example to be replaced by service personnel, examples of which could include print heads, toner process cartridges, or logic circuit package by itself to adhere to corresponding print apparatus component and communicate to a compatible print apparatus logic circuit.

Figure 2:
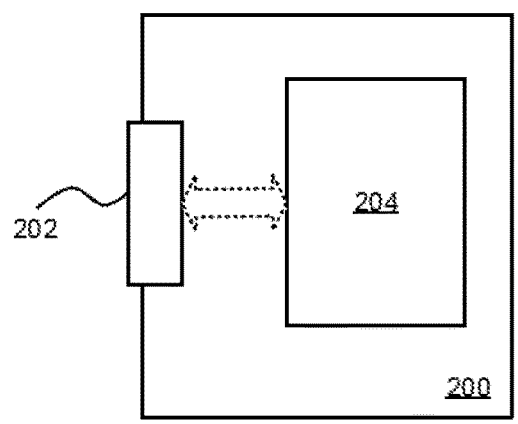
FIG. 2 illustrates one example of a replaceable print apparatus component.

FIG. 2 illustrates one example of a replaceable print apparatus component 200, which may provide the replaceable print apparatus component 104 of FIG. 1. The replaceable print apparatus component 200 includes a data interface 202 and a logic circuitry package 204. In use of the replaceable print apparatus component 200, the logic circuitry package 204 decodes data received via the data interface 202. The logic circuitry may perform other functions as set out below. The data interface 202 may include an I2C or other interface. In certain examples, the data interface 202 may be part of the same package as the logic circuitry package 204.

In some examples, the logic circuitry package 204 may be further configured to encode data for transmission via the data interface 202. In some examples, there may be more than one data interface 202 provided. In some examples, the logic circuitry package 204 may be arranged to act as a 'slave' in I2C communications.

Figure 3:
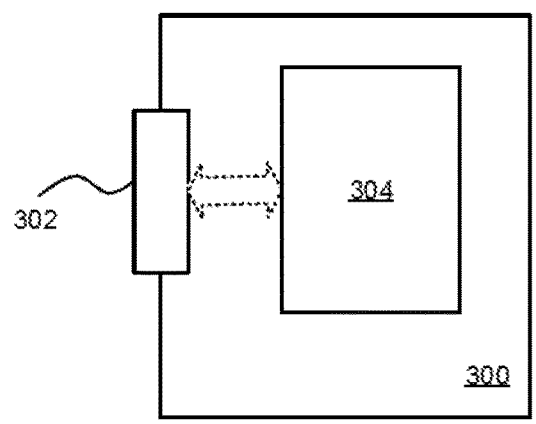
FIG. 3 illustrates one example of a print apparatus.

FIG. 3 illustrates one example of a print apparatus 300. The print apparatus 300 may provide the print apparatus 102 of FIG. 1. The print apparatus 300 may serve as a host for replaceable components. The print apparatus 300 includes an interface 302 for communicating with a replaceable print apparatus component and a controller 304. The controller 304 includes logic circuitry. In some examples, the interface 302 is an I2C interface.

In some examples, controller 304 may be configured to act as a host, or a master, in I2C communications. The controller 304 may generate and send commands to at least one replaceable print apparatus component 200, and may receive and decode responses received therefrom. In other examples the controller 304 may communicate with the logic circuitry package 204 using any form of digital or analog communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200. In many cases, this compatibility may be provided by the print apparatus 102, 300 as the replaceable print apparatus components 104, 200 may be relatively resource constrained in terms of their processing and/or memory capacity.

Figure 4A:
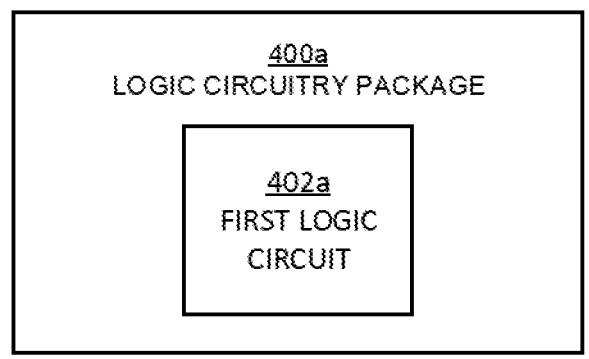
FIGS. 4A-4E illustrate examples of logic circuitry packages and processing circuitry.

FIG. 4A illustrates one example of a logic circuitry package 400a, which may for example provide the logic circuitry package 204 described in relation to FIG. 2. The logic circuitry package 400a may be associated with, or in some examples affixed to and/or be incorporated at least partially within, a replaceable print apparatus component 200.

In some examples, the logic circuitry package 400a is addressable via a first address and includes a first logic circuit 402a, wherein the first address is an I2C address for the first logic circuit 402a. In some examples, the first address may be configurable. In other examples, the first address is a fixed address (e.g., "hard-wired") intended to remain the same address during the lifetime of the first logic circuit 402a. The first address may be associated with the logic circuitry package 400a at and during the connection with the print apparatus logic circuit, outside of the time periods that are associated with a second address, as will be set out below. In example systems where a plurality of replaceable print apparatus components are to be connected to a single print apparatus, there may be a corresponding plurality of different first addresses. In certain examples, the first addresses can be considered standard I2C addresses for logic circuitry packages 400a or replaceable print components.

In some examples, the logic circuitry package 400a is also addressable via a second address. For example, the second address may be associated with different logic functions or, at least partially, with different data than the first address. In some examples, the second address may be associated with a different hardware logic circuit or a different virtual device than the first address. In some examples, the logic circuitry package 400a may include a memory to store the second address (in some examples in a volatile manner). In some examples, the memory may include a programmable address memory register for this purpose. The second address may have a default second address while the second address (memory) field may be reconfigurable to a different address. For example, the second address may be reconfigurable to a temporary address by a second address command, whereby it is set (back) to the default second address after or at each time period command to enable the second address. For example, the second address may be set to its default address in an out-of-reset state whereby, after each reset, it is reconfigurable to the temporary (i.e., reconfigured) address.

In some examples, the package 400a is configured such that, in response to a first command indicative of a first time period sent to the first address (and in some examples a task), the package 400a may respond in various ways. In some examples, the package 400a is configured such that it is accessible via at least one second address for the duration of the time period. Alternatively or additionally, in some examples, the package may perform a task, which may be the task specified in the first command. In other examples, the package may perform a different task. The first command may, for example, be sent by a host such as a print apparatus in which the logic circuitry package 400a (or an associated replaceable print apparatus component) is installed. As set out in greater detail below, the task may include obtaining a sensor reading.

Further communication may be directed to memory addresses to be used to request information associated with these memory addresses. The memory addresses may have a different configuration than the first and second address of the logic circuitry package 400a. For example, a host apparatus may request that a particular memory register is read out onto the bus by including the memory address in a read command. In other words, a host apparatus may have a knowledge and/or control of the arrangement of a memory. For example, there may be a plurality of memory registers and corresponding memory addresses associated with the second address. A particular register may be associated with a value, which may be static or reconfigurable. The host apparatus may request that the register be read out onto the bus by identifying that register using the memory address. In some examples, the registers may include any or any combination of address register(s), parameter register(s) (for example to store clock enable, clock source replacement, clock divider, and/or dither parameters), sensor identification register(s) (which may store an indication of a type of sensor), sensor reading register(s) (which may store values read or determined using a sensor), sensor number register(s) (which may store a number or count of sensors), version identity register(s), memory register(s) to store a count of clock cycles, memory register(s) to store a value indicative of a read/write history of the logic circuitry, or other registers.

Figure 4B:
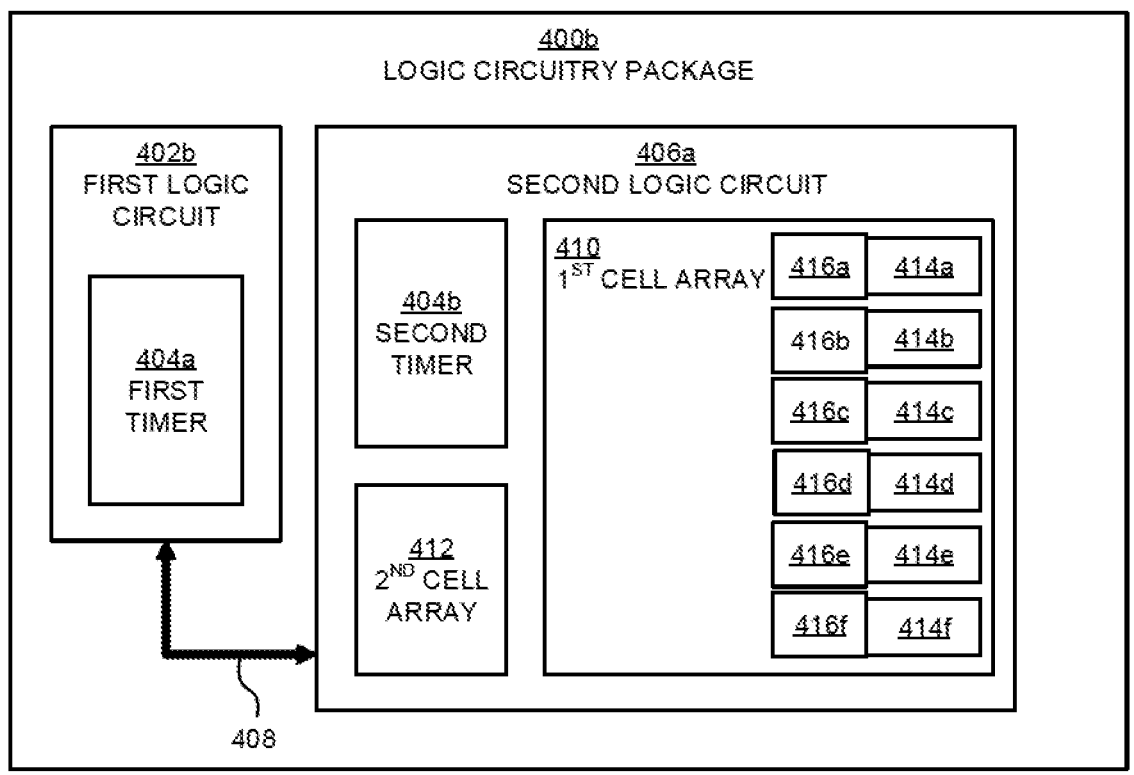

FIG. 4B illustrates another example of a logic circuitry package 400b. In this example, the package 400b includes a first logic circuit 402b, in this example, including a first timer 404a, and a second logic circuit 406a, in this example, including a second timer 404b. While in this example, each of the first and second logic circuits 402b, 406a include its own timer 404a, 404b, in other examples, they may share a timer or reference at least one external timer. In a further example, the first logic circuit 402b and the second logic circuit 406a are linked by a dedicated signal path 408.

In one example, the logic circuitry package 400b may receive a first command including two data fields. A first data field is a one byte data field setting a requested mode of operation. For example, there may be a plurality of predefined modes, such as a first mode, in which the logic circuitry package 400b is to ignore data traffic sent to the first address (for example, while performing a task), and a second mode in which the logic circuitry package 400b is to ignore data traffic sent to the first address and to transmit an enable signal to the second logic circuit 406a, as is further set out below. The first command may include additional fields, such as an address field and/or a request for acknowledgement.

The logic circuitry package 400b is configured to process the first command. If the first command cannot be complied with (for example, a command parameter is of an invalid length or value, or it is not possible to enable the second logic circuit 406a), the logic circuitry package 400b may generate an error code and output this to a communication link to be returned to host logic circuitry, for example in the print apparatus.

If, however, the first command is validly received and can be complied with, the logic circuitry package 400b measures the duration of the time period included in the first command, for example utilizing the timer 404a. In some examples, the timer 404a may include a digital "clock tree". In other examples, the timer 404a may include an RC circuit, a ring oscillator, or some other form of oscillator or timer. In this example, in response to receiving a valid first command, the first logic circuit 402b enables the second logic circuit 406a and effectively disables the first address, for example by tasking the first logic circuit 402b with a processing task. In some examples, enabling the second logic circuit 406a includes sending, by the first logic circuit 402b, an activation signal to the second logic circuit 406a. In other words, in this example, the logic circuitry package 400b is configured such that the second logic circuit 406a is selectively enabled by the first logic circuit 402b.

In this example, the second logic circuit 406a is enabled by the first logic circuit 402b sending a signal via a signal path 408, which may or may not be a dedicated signal path 408, that is, dedicated to enable the second logic circuit 406a. In one example, the first logic circuit 402b may have a dedicated contact pin or pad connected to the signal path 408, which links the first logic circuit 402b and the second logic circuit 406a. In a particular example, the dedicated contact pin or pad may be a General Purpose Input/Output (a GPIO) pin of the first logic circuit 402b. The contact pin/pad may serve as an enablement contact of the second logic circuit 406a.

In this example, the second logic circuit 406a is addressable via at least one second address. In some examples, when the second logic circuit 406a is activated or enabled, it may have an initial, or default, second address, which may be an I2C address or have some other address format. The second logic circuit 406a may receive instructions from a master or host logic circuitry to change the initial address to a temporary second address. In some examples, the temporary second address may be an address which is selected by the master or host logic circuitry. This may allow the second logic circuit 406a to be provided in one of a plurality of packages 400 on the same I2C bus which, at least initially, share the same initial second address. This shared, default, address may later be set to a specific temporary address by the print apparatus logic circuit, thereby allowing the plurality of packages to have different second addresses during their temporary use, facilitating communications to each individual package. At the same time, providing the same initial second address may have manufacturing or testing advantages. In this disclosure, the temporary second address is also referred to as third address, temporary address, or reconfigured address.

In some examples, the second logic circuit 406a may include a memory. The memory may include a programmable address register to store the initial and/or temporary second address (in some examples in a volatile manner). In some examples, the second address may be set following, and/or by executing, an I2C write command. In some examples, the second address may be settable when the enablement signal is present or high, but not when it is absent or low. The second address may be set to a default address when an enablement signal is removed and/or on restoration of enablement of the second logic circuit 406a. For example, each time the enable signal over the signal path 408 is low, the second logic circuit 406a, or the relevant part(s) thereof, may be reset. The default address may be set when the second logic circuit 406a, or the relevant part(s) thereof, is switched out-of-reset. In some examples, the default address is a 7-bit or 10-bit identification value. In some examples, the default address and the temporary second address may be written in turn to a single, common, address register.

In the example illustrated in FIG. 4B, the second logic circuit 406a includes a first array 410 of cells and at least one second cell 412 or second array of second cells of a different type than the cells of the first array 410. In some examples, the second logic circuit 406a may include additional sensor cells of a different type than the cells of the first array 410 and the at least one second cell 412. Each of the plurality of sensor types may be identifiable by a different sensor ID, while each cell in a cell array of the same type may be identifiable by sub-IDs. The sensor IDs and sub-IDs may include a combination of addresses and values, for example register addresses and values. The addresses of the sensor ID and sub-ID are different. For example, an address selects a register that has a function to select a particular sensor or cell, and in the same transaction, the value selects the sensor or cell, respectively. Hence, the second logic circuit may include registers and multiplex circuitry to select sensor cells in response to sensor IDs and sub-IDs.

The first cells 416a-416f, 414a-414f and the at least one second cell 412 can include resistors. The first cells 416a-416f, 414a-414f and the at least one second cell 412 can include sensors. In one example, the first cell array 410 includes a print material level sensor and the at least one second cell 412 includes another sensor and/or another sensor array, such as an array of strain sensing cells. Further sensor types may include temperature sensors, resistors, diodes, crack sensors, etc.

In this example, the first cell array 410 includes a sensor configured to detect a print material level of a print supply, which may in some examples be a solid but in examples described herein is a liquid, for example, an ink or other liquid print agent. The first cell array 410 may include a series of temperature sensors (e.g., cells 414a-414f) and a series of heating elements (e.g., cells 416a-416f), for example similar in structure and function as compared to the level sensor arrays described in WO2017/074342, WO2017/184147, and WO2018/022038. In this example, the resistance of a resistor cell 414 is linked to its temperature. The heater cells 416 may be used to heat the sensor cells 414 directly or indirectly using a medium. The subsequent behavior of the sensor cells 414 depends on the medium in which they are submerged, for example whether they are in liquid (or in some examples, encased in a solid medium) or in air. Those which are submerged in liquid/encased may generally lose heat quicker than those which are in air because the liquid or solid may conduct heat away from the resistor cells 414 better than air. Therefore, a liquid level may be determined based on which of the resistor cells 414 are exposed to the air, and this may be determined based on a reading of their resistance following (at least the start of) a heat pulse provided by the associated heater cell 416.

In some examples, each sensor cell 414 and heater cell 416 are stacked with one being directly on top of the other. The heat generated by each heater cell 416 may be substantially spatially contained within the heater element layout perimeter, so that heat delivery is substantially confined to the sensor cell 414 stacked directly above the heater cell 416. In some examples, each sensor cell 414 may be arranged between an associated heater cell 416 and the fluid/air interface.

In this example, the second cell array 412 includes a plurality of different cells that may have a different function such as different sensing function(s). For example, the first and second cell array 410, 412 may include different resistor types. Different cells arrays 410, 412 for different functions may be provided in the second logic circuit 406a.

Figure 4C:
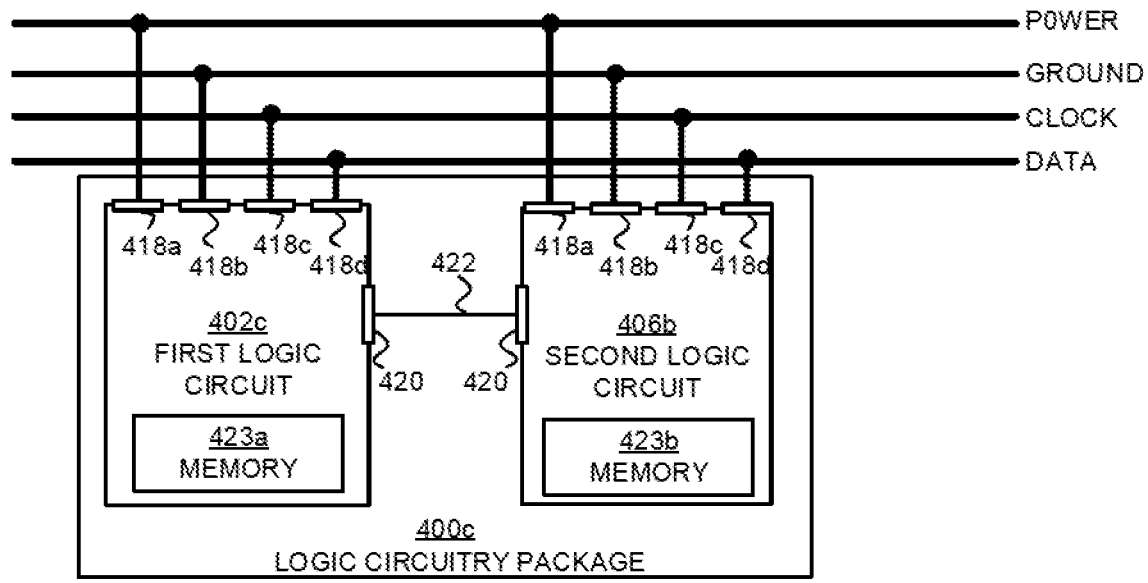

FIG. 4C illustrates an example of how a first logic circuit 402c and a second logic circuit 406b of a logic circuitry package 400c, which may have any of the attributes of the circuits/packages described above, may connect to an I2C bus and to each other. As is shown in the Figure, each of the circuits 402c, 406b has four pads (or pins) 418a-418d connecting to the Power, Ground, Clock, and Data lines of an I2C bus. In another example, four common connection pads are used to connect both logic circuits 402c, 406b to four corresponding connection pads of the print apparatus controller interface. It is noted that in some examples, instead of four connection pads, there may be less connection pads. For example, power may be harvested from the clock pad; an internal clock may be provided; or the package could be grounded through another ground circuit; so that, one or more of the pads may be omitted or made redundant. Hence, in different examples, the package could use only two or three interface pads and/or could include "dummy" pads.

Each of the circuits 402c, 406b has a contact pin 420, which are connected by a common signal line 422. The contact pin 420 of the second circuit serves as an enablement contact thereof.

In this example, each of the first logic circuit 402c and the second logic circuit 406b include a memory 423a, 423b. The memory 423a of the first logic circuit 402c stores information including cryptographic values (for example, a cryptographic key and/or a seed value from which a key may be derived) and identification data and/or status data of the associated replaceable print apparatus component. In some examples, the memory 423a may store data representing characteristics of the print material, for example, any part, or any combination of its type, color, color map, recipe, batch number, age, etc.

The memory 423b of the second logic circuit 406b includes a programmable address register to contain an initial address of the second logic circuit 406b when the second logic circuit 406b is first enabled and to subsequently contain a further (temporary) second address (in some examples in a volatile manner). The further, e.g., temporary, second address may be programmed into the second address register after the second logic circuit 406b is enabled, and may be effectively erased or replaced at the end of an enablement period. In some examples, the memory 423b may further include programmable registers to store any, or any combination of a read/write history data, cell (e.g., resistor or sensor) count data, Analog to Digital converter data (ADC and/or DAC), and a clock count, in a volatile or non-volatile manner. The memory 423b may also receive and/or store calibration parameters, such as offset and gain parameters. Use of such data is described in greater detail below. Certain characteristics, such as cell count or ADC or DAC characteristics, could be derivable from the second logic circuit instead of being stored as separate data in the memory.

In one example, the memory 423*b* of the second logic circuit 406*b* stores any or any combination of an address, for example the second I2C address; an identification in the form of a revision ID; and the index number of the last cell (which may be the number of cells less one, as indices may start from 0), for example for each of different cell arrays or for multiple different cell arrays if they have the same number of cells.

In use of the second logic circuit 406*b*, in some operational states, the memory 423*b* of the second logic circuit 406 may store any or any combination of timer control data, which may enable a timer of the second circuit, and/or enable frequency dithering therein in the case of some timers such as ring oscillators; a dither control data value (to indicate a dither direction and/or value); and a timer sample test trigger value (to trigger a test of the timer by sampling the timer relative to clock cycles measureable by the second logic circuit 406*b*).

While the memories 423*a*, 423*b* are shown as separate memories here, they could be combined as a shared memory resource, or divided in some other way. The memories 423*a*, 423*b* may include a single or multiple memory devices, and may include any or any combination of volatile memory (e.g., DRAM, SRAM, registers, etc.) and non-volatile memory (e.g., ROM, EEPROM, Flash, EPROM, memristor, etc.).

While one package 400*c* is shown in FIG. 4C, there may be a plurality of packages with a similar or a different configuration attached to the bus.

Figure 4D:
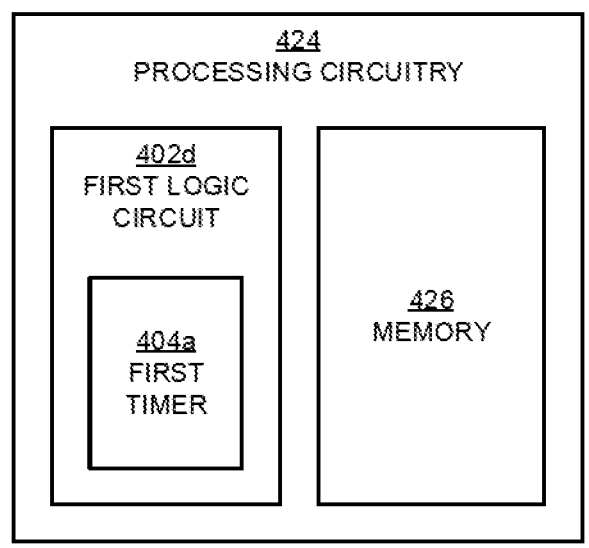

FIG. 4D illustrates an example of processing circuitry 424 which is for use with a print material container. For example, the processing circuitry 424 may be affixed or integral thereto. As already mentioned, the processing circuitry 424 may include any of the features of, or be the same as, any other logic circuitry package of this disclosure.

In this example, the processing circuitry 424 includes a memory 426 and a first logic circuit 402*d* which enables a read operation from memory 426. The processing circuitry 424 is accessible via an interface bus of a print apparatus in which the print material container is installed and is associated with a first address and at least one second address. The bus may be an I2C bus. The first address may be an I2C address of the first logic circuit 402*d*. The first logic circuit 402*d* may have any of the attributes of the other examples circuits/packages described in this disclosure.

The first logic circuit 402*d* is adapted to participate in authentication of the print materials container by a print apparatus in which the container is installed. For example, this may include a cryptographic process such as any kind of cryptographically authenticated communication or message exchange, for example based on a cryptographic key stored in the memory 426, and which can be used in conjunction with information stored in the printer. In some examples, a printer may store a version of a key which is compatible with a number of different print material containers to provide the basis of a 'shared secret'. In some examples, authentication of a print material container may be carried out based on such a shared secret. In some examples, the first logic circuit 402*d* may participate in a message to derive a session key with the print apparatus and messages may be signed using a message authentication code based on such a session key. Examples of logic circuits configured to cryptographically authenticate messages in accordance with this paragraph are described in U.S. Pat. No. 9,619,663.

In some examples, the memory 426 may store data including: identification data and read/write history data. In some examples, the memory 426 further includes cell count data (e.g., sensor count data) and clock count data. Clock count data may indicate a clock speed of a first and/or second timer 404*a*, 404*b* (i.e., a timer associated with the first logic circuit or the second logic circuit). In some examples, at least a portion of the memory 426 is associated with functions of a second logic circuit, such as a second logic circuit 406*a* as described in relation to FIG. 4B above. In some examples, at least a portion of the data stored in the memory 426 is to be communicated in response to commands received via the second address. In some examples, the memory 426 includes a programmable address register or memory field to store a second address of the processing circuitry (in some examples in a volatile manner). The first logic circuit 402*d* may enable read operation from the memory 426 and/or may perform processing tasks.

The memory 426 may, for example, include data representing characteristics of the print material, for example any or any combination of its type, color, batch number, age, etc. The memory 426 may, for example, include data to be communicated in response to commands received via the first address. The processing circuitry may include a first logic circuit to enable read operations from the memory and perform processing tasks.

In some examples, the processing circuitry 424 is configured such that, following receipt of the first command indicative of a task and a first time period sent to the first logic circuit 402*d* via the first address, the processing circuitry 424 is accessible by at least one second address for a duration of the first time period. Alternatively or additionally, the processing circuitry 424 may be configured such that in response to a first command indicative of a task and a first time period sent to the first logic circuit 402*d* addressed using the first address, the processing circuitry 424 is to disregard (e.g., 'ignore' or 'not respond to') I2C traffic sent to the first address for substantially the duration of the time period as measured by a timer of the processing circuitry 424 (for example a timer 404*a*, 404*b* as described above). In some examples, the processing circuitry may additionally perform a task, which may be the task specified in the first command. The term 'disregard' or 'ignore' as used herein with respect to data sent on the bus may include any or any combination of not receiving (in some examples, not reading the data into a memory), not acting upon (for example, not following a command or instruction) and/or not responding (i.e., not providing an acknowledgement, and/or not responding with requested data).

The processing circuitry 424 may have any of the attributes of the logic circuitry packages 400 described herein. In particular, the processing circuitry 424 may further include a second logic circuit wherein the second logic circuit is accessible via the second address. In some examples, the second logic circuit may include at least one sensor which is readable by a print apparatus in which the print material container is installed via the second address. In some examples, such a sensor may include a print materials level sensor.

Figure 4E:
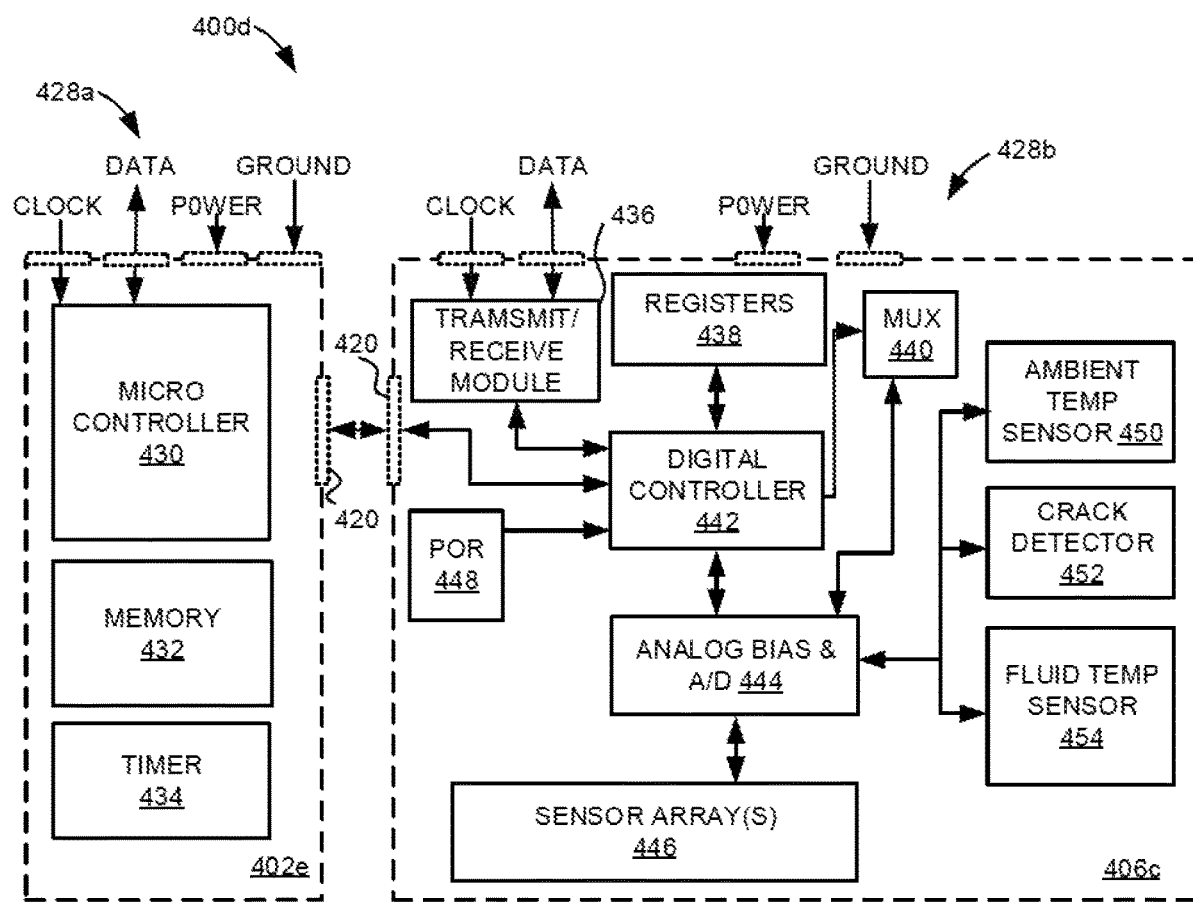

FIG. 4E illustrates another example of a first logic circuit 402*e* and second logic circuit 406*c* of a logic circuitry package 400*d*, which may have any of the attributes of the circuits/packages of the same names described herein, which may connect to an I2C bus via respective interfaces 428*a*, 428*b* and to each other. In one example the respective interfaces 428*a*, 428*b* are connected to the same contact pad array, with only one data pad for both logic circuits 402*e*, 406c, connected to the same serial I2C bus. In other words, in some examples, communications addressed to the first and the second address are received via the same data pad.

In this example, the first logic circuit 402e includes a microcontroller 430, a memory 432, and a timer 434. The microcontroller 430 may be a secure microcontroller or customized integrated circuitry adapted to function as a microcontroller, secure or non-secure.

In this example, the second logic circuit 406c includes a transmit/receive module 436, which receives a clock signal and a data signal from a bus to which the package 400d is connected, data registers 438, a multiplexer 440, a digital controller 442, an analog bias and analog to digital converter 444, at least one sensor or cell array 446 (which may in some examples include a level sensor with one or multiple arrays of resistor elements), and a power-on reset (POR) device 448. The POR device 448 may be used to allow operation of the second logic circuit 406c without use of a contact pin 420.

The analog bias and analog to digital converter 444 receives readings from the sensor array(s) 446 and from additional sensors. For example, a current may be provided to a sensing resistor and the resultant voltage may be converted to a digital value. That digital value may be stored in a register and read out (i.e., transmitted as serial data bits, or as a 'bitstream') over the I2C bus. The analog to digital converter 444 may utilize parameters, for example, gain and/or offset parameters, which may be stored in registers.

In this example, there are different additional single sensors, including for example at least one of an ambient temperature sensor 450, a crack detector 452, and/or a fluid temperature sensor 454. These may sense, respectively, an ambient temperature, a structural integrity of a die on which the logic circuitry is provided, and a fluid temperature.

Figure 5A:
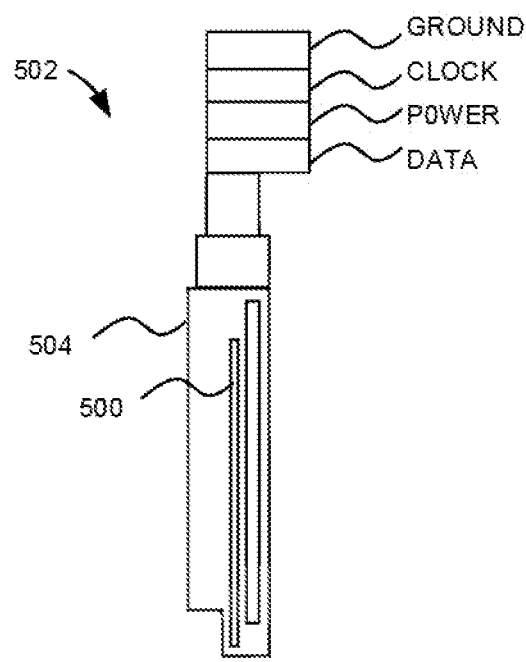
FIG. 5A illustrates one example arrangement of a fluid level sensor.

FIG. 5A illustrates an example of a possible practical arrangement of a second logic circuit embodied by a sensor assembly 500 in association with a circuitry package 502. The sensor assembly 500 may include a thin film stack and include at least one sensor array such as a fluid level sensor array. The arrangement has a high length to width aspect ratio (e.g., as measured along a substrate surface), for example being around 0.2 mm in width, for example less than 1 mm, 0.5 mm, or 0.3 mm, and around 20 mm in length, for example more than 10 mm, leading to length to width aspect ratios equal to or above approximately 20:1, 40:1, 60:1, 80:1, or 100:1. In an installed condition the length may be measured along the height. The logic circuit in this example may have a thickness of less than 1 mm, less than 0.5 mm, or less than 0.3 mm, as measured between the bottom of the (e.g., silicon) substrate and the opposite outer surface. These dimensions mean that the individual cells or sensors are small. The sensor assembly 500 may be provided on a relatively rigid carrier 504, which in this example also carries Ground, Clock, Power and Data I2C bus contacts.

Figure 5B:
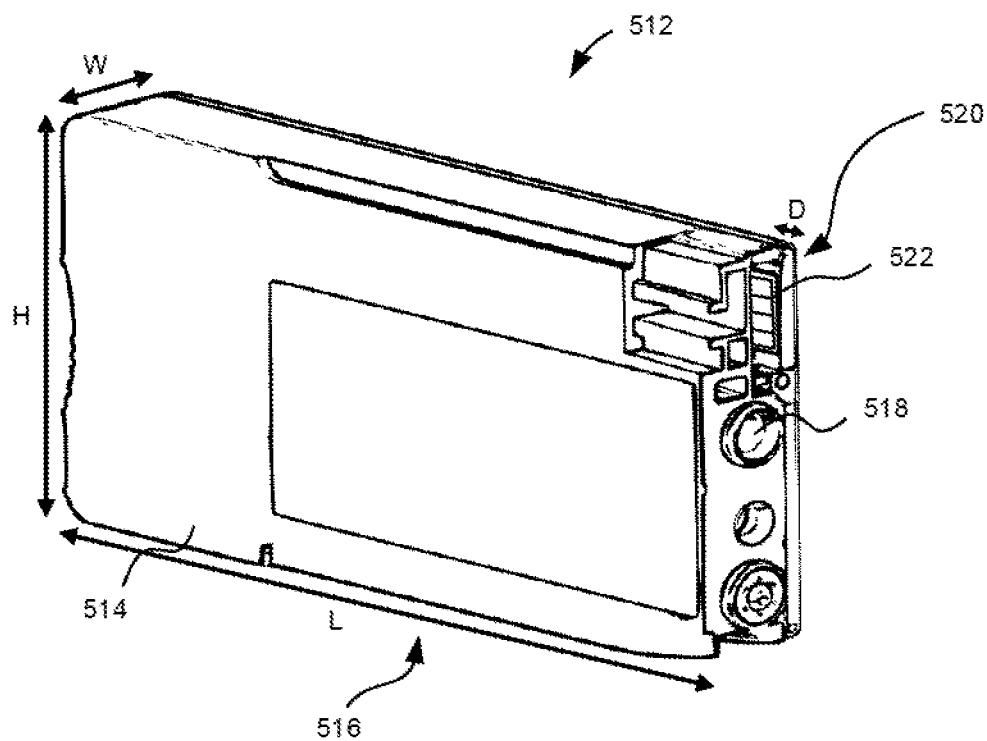
FIG. 5B illustrates a perspective view of one example of a print cartridge.

FIG. 5B illustrates a perspective view of a print cartridge 512 including a logic circuitry package of any of the examples of this disclosure. The print cartridge 512 has a housing 514 that has a width W less than its height H and that has a length L or depth that is greater than the height H. A print liquid output 516 (in this example, a print agent outlet provided on the underside of the cartridge 512), an air input 518 and a recess 520 are provided in a front face of the cartridge 512. The recess 520 extends across the top of the cartridge 512 and I2C bus contacts (i.e., pads) 522 of a logic circuitry package 502 (for example, a logic circuitry package 400a-400d as described above) are provided at a side of the recess 520 against the inner wall of the side wall of the housing 514 adjacent the top and front of the housing 514. In this example, the data contact is the lowest of the contacts 522. In this example, the logic circuitry package 502 is provided against the inner side of the side wall. In some examples, the logic circuitry package 502 includes a sensor assembly as shown in FIG. 5A.

Placing logic circuitry within a print material cartridge may create challenges for the reliability of the cartridge due to the risks that electrical shorts or damage can occur to the logic circuitry during shipping and user handling, or over the life of the product.

A damaged sensor may provide inaccurate measurements, and result in inappropriate decisions by a print apparatus when evaluating the measurements. Therefore, a method may be used to verify that communications with the logic circuitry based on a specific communication sequence provide expected results. This may validate the operational health of the logic circuitry.

In other examples, a replaceable print apparatus component includes a logic circuitry package of any of the examples described herein, wherein the component further includes a volume of liquid. The component may have a height H that is greater than a width W and a length L that is greater than the height, the width extending between two sides. Interface pads of the package may be provided at the inner side of one of the sides facing a cut-out for a data interconnect to be inserted, the interface pads extending along a height direction near the top and front of the component, and the data pad being the bottom-most of the interface pads, the liquid and air interface of the component being provided at the front on the same vertical reference axis parallel to the height H direction wherein the vertical axis is parallel to and distanced from the axis that intersects the interface pads (i.e., the pads are partially inset from the edge by a distance D). The rest of the logic circuitry package may also be provided against the inner side.

Figure 6A:
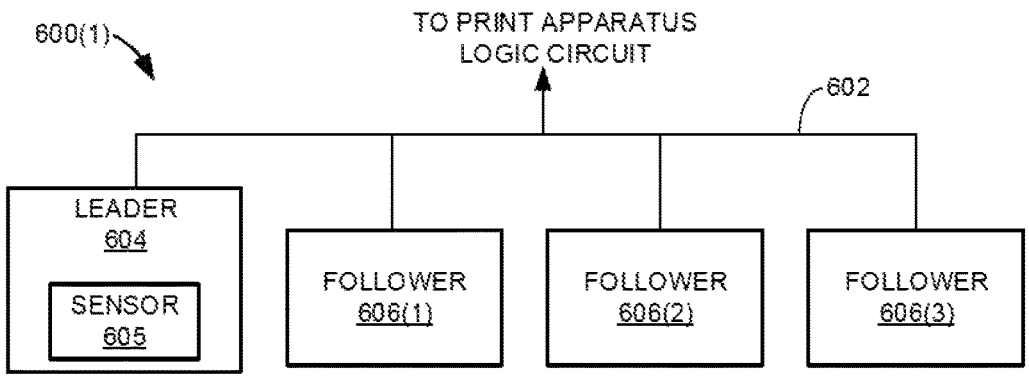
FIGS. 6A-6E illustrate example configurations of replaceable print apparatus components including leader and follower components.

FIGS. 6A-6E illustrate example configurations of replaceable print apparatus components including leader and follower components. In one example, the components are print supply components. As shown in FIG. 6A, configuration 600(1) includes leader component 604 and follower components 606(1)-606(3), which are communicatively coupled to each other and to a print apparatus logic circuit (not shown) via communication bus 602. In one example, communication bus 602 is an I2C bus. Leader component 604 may include any of the logic circuitry described herein, and includes at least one analog sensor 605. Sensor 605 may include a plurality of different types of sensors (e.g., a sensor array of ink level sensor cells, a sensor array of strain gauge sensor cells, as well as individual sensors, such as a global thermal sensor, thermal diode, a crack detect sensor, or any other type of sensor). In one example, follower components 606(1)-606(3) do not include a sensor 605, and are digital-only devices.

In operation according to one example, the leader component 604 receives, via the communication bus 602, a request from the print apparatus logic circuit to provide sensor information from the sensor 605. In response to the request, the leader component 604 causes the sensor 605 to generate sensor information, and provides a response to the request including the sensor information, via the communication bus 602, to the print apparatus logic circuit. Each of the follower components 606(1)-606(3) monitors the request sent to the leader component 604, and the response from the leader component 604, via the communication bus 602. When any of the follower components 606(1)-606(3) receives, via the communication bus 602, the same type of request that was previously sent to the leader component 604, that follower component responds, via the communication bus 602, with the same response that the leader component 604 previously sent. In this manner, for requests related to sensor information, the follower components 606(1)-606(3) mime the responses of the leader component 604. This allows the print apparatus logic circuit to treat all of the components the same regardless of whether they include a sensor 605, and enables any combination of leader/follower components to complete a full set in a print apparatus.

Figure 6B:
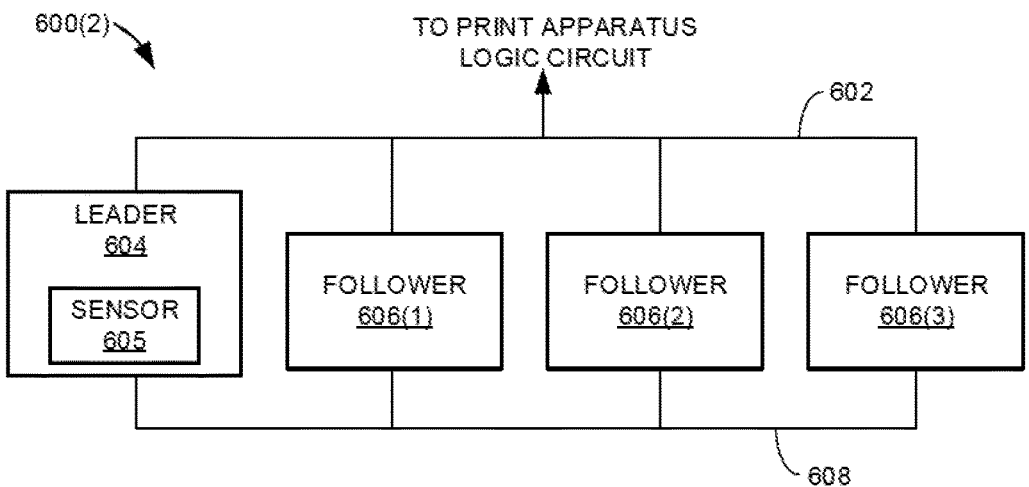

As shown in FIG. 6B, configuration 600(2) is the same as configuration 600(1) (FIG. 6A), with the exception that a communication link 608 is added that communicatively couples together the leader component 604 and the follower components 606(1)-606(3). In one example, the print apparatus logic circuit is not coupled to the communication link 608. In one example, communication link 608 is an I2C bus, a wireless communication link (e.g., Bluetooth), or another type of communication link. Communication link 608 allows the leader component 604 and the follower components 606(1)-606(3) to directly communicate with each other, including providing sensor information from the leader component 604 to the follower components 606(1)-606(3). The follower components 606(1)-606(3) can then provide this sensor information to the print apparatus logic circuit via communication link 602 when requested by the print apparatus logic circuit. Communication link 608 allows the leader component 604 to transmit and receive directly with the follower components 606(1)-606(3) to exchange whatever information is requested, without having to rely on the print apparatus logic circuit to drive I2C communications. Communication link 608 also helps reduce the risk of interfering with printer communications.

Figure 6C:
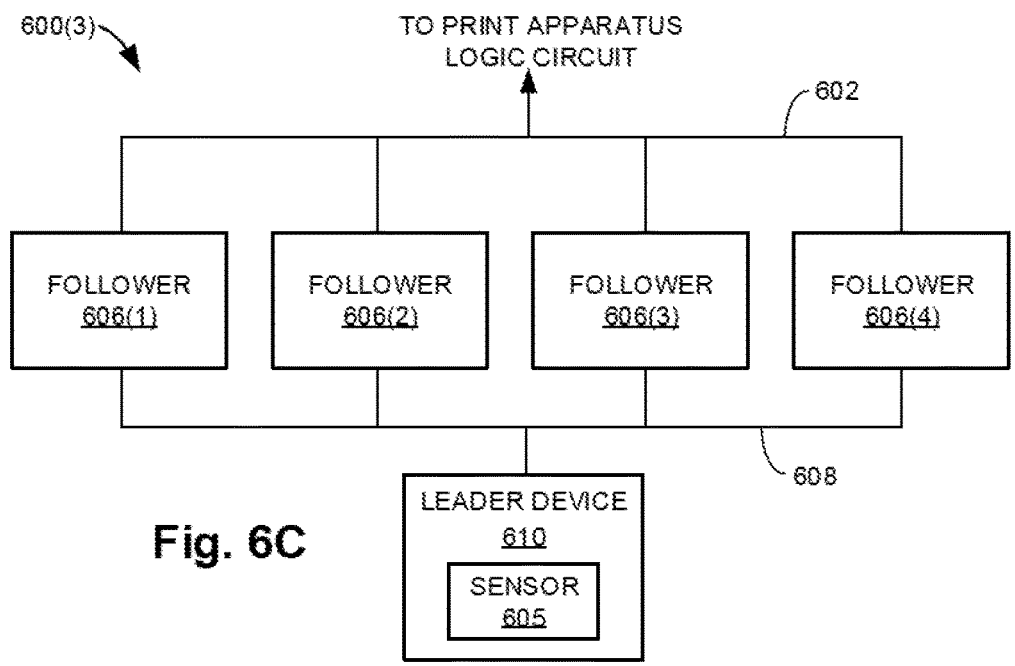

As shown in FIG. 6C, configuration 600(3) includes leader device 610 with sensor 605, and follower components 606(1)-606(4). In one example, leader device 610 is not a print supply component, but rather is a permanent or semi-permanent device that is installed in a print apparatus and is capable of sensing functionality (e.g., via sensor 605). Follower components 606(1)-606(4) are communicatively coupled to each other and to a print apparatus logic circuit (not shown) via communication bus 602. Follower components 606(1)-606(4) are communicatively coupled to each other and to leader device 610 via communication link 608. Communication link 608 allows the leader device 610 and the follower components 606(1)-606(4) to directly communicate with each other, including providing sensor information from the leader device 610 to the follower components 606(1)-606(4). The follower components 606(1)-606(4) can then provide this sensor information to the print apparatus logic circuit via communication link 602 when requested by the print apparatus logic circuit. Communication link 608 allows the leader device 610 to transmit and receive directly with the follower components 606(1)-606(4) to exchange whatever information is requested, without having to rely on the print apparatus logic circuit to drive I2C communications.

Figure 6D:
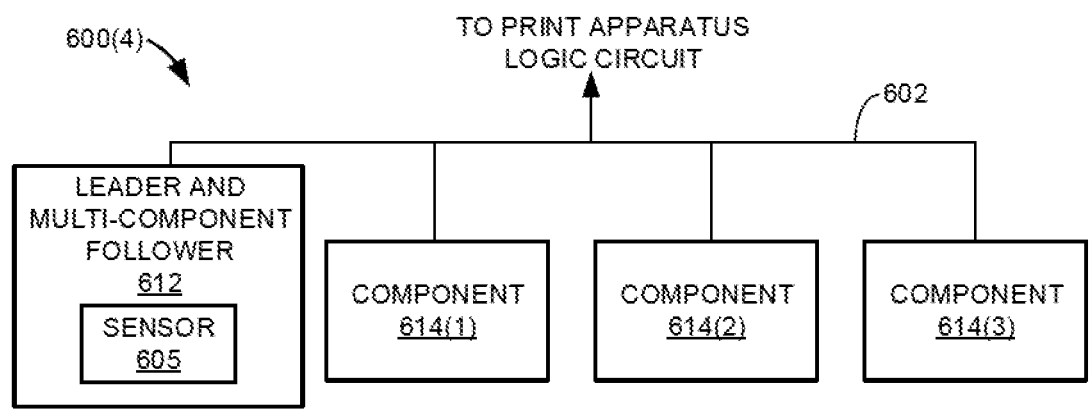

As shown in FIG. 6D, configuration 600(4) includes leader and multi-component follower component 612 and components 614(1)-614(3), which are communicatively coupled to each other and to a print apparatus logic circuit (not shown) via communication bus 602. In one example, communication bus 602 is an I2C bus. Leader and multi-component follower component 612 may include any of the logic circuitry described herein, and includes at least one analog sensor 605. Sensor 605 may include a plurality of different types of sensors (e.g., a sensor array of ink level sensor cells, a sensor array of strain gauge sensor cells, as well as individual sensors, such as a global thermal sensor, thermal diode, a crack detect sensor, or any other type of sensor). In one example, components 614(1)-614(3) do not include any sensors, and do not include any electronic chips.

In operation according to one example, the leader and multi-component follower component 612 receives, via the communication bus 602, a request from the print apparatus logic circuit to provide sensor information from the sensor 605. In response to the request, the component 612 causes the sensor 605 to generate sensor information, and provides a response to the request including the sensor information, via the communication bus 602, to the print apparatus logic circuit. The leader and multi-component follower component 612 also monitors the communication bus 602 for requests directed to components 614(1)-614(3). When such a request has been sent by the print apparatus logic circuit to one of the components 614(1)-614(3), component 612 sends a response to the print apparatus logic circuit on behalf of that one of the components 614(1)-614(3). The response may be based on a previous response sent by the component 612 (e.g., it may be the same response as the previous response), or the component 612 may cause the sensor 605 to generate new sensor information, and provide a response to the request that includes the new sensor information.

Figure 6E:
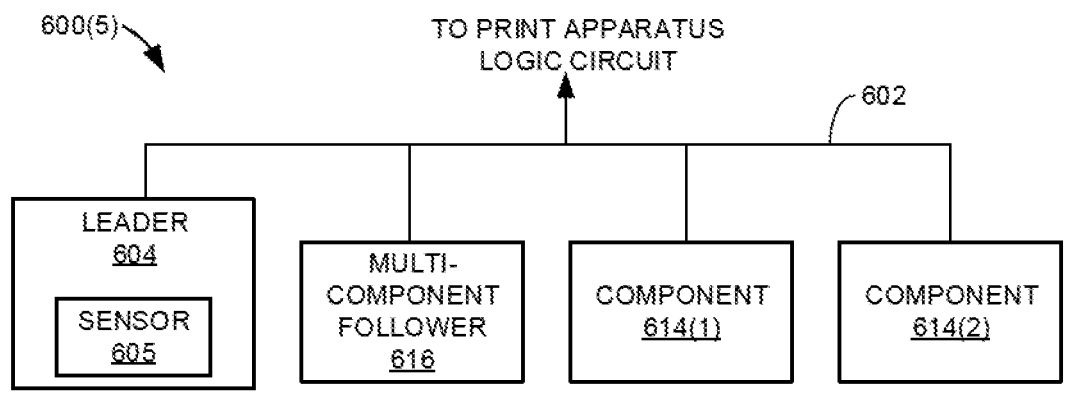

As shown in FIG. 6E, configuration 600(5) includes leader component 604, multi-component follower component 616, and components 614(1)-614(2), which are communicatively coupled to each other and to a print apparatus logic circuit (not shown) via communication bus 602. In one example, communication bus 602 is an I2C bus. Leader component 604 and multi-component follower component 616 may each include any of the logic circuitry described herein. Leader component 604 includes at least one analog sensor 605. Sensor 605 may include a plurality of different types of sensors (e.g., a sensor array of ink level sensor cells, a sensor array of strain gauge sensor cells, as well as individual sensors, such as a global thermal sensor, thermal diode, a crack detect sensor, or any other type of sensor). In one example, components 614(1)-614(2) do not include any sensors, and do not include any electronic chips.

Figure 7A:
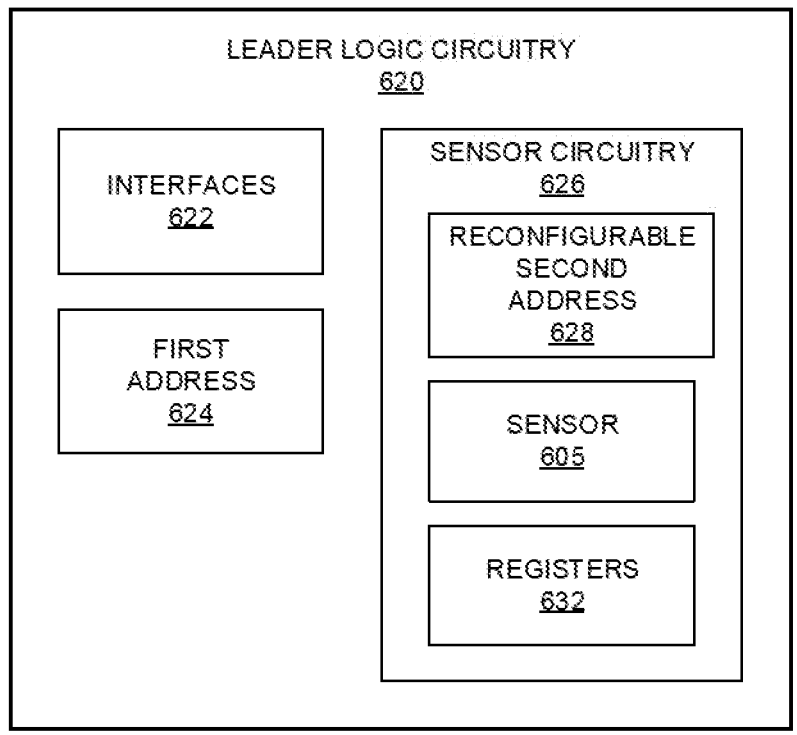
FIG. 7A illustrates one example of leader logic circuitry.

In operation according to one example, the leader component 604 receives, via the communication bus 602, a request from the print apparatus logic circuit to provide sensor information from the sensor 605. In response to the request, the leader component 604 causes the sensor 605 to generate sensor information, and provides a response to the request including the sensor information, via the communication bus 602, to the print apparatus logic circuit. The multi-component follower component 616 monitors the request sent to the leader component 604, and the response from the leader component 604, via the communication bus 602. When multi-component follower component 616 receives, via the communication bus 602, the same type of request that was previously sent to the leader component 604, the component 616 may respond, via the communication bus 602, with the same response that the leader component 604 previously sent. The multi-component follower component 616 also monitors the communication bus 602 for requests directed to components 614(1)-614(2). When the same type of request that was previously sent to the leader component 604 is directed to one of the components 614(1)-614(2), the component 616 may respond on behalf of that one of the components 614(1)-614(2), via the communication bus 602, with the same response that the leader component previously sent. In this manner, for requests related to sensor information, the component 616 mimes the responses of the leader component 604 for its own responses and for responses sent on behalf of components 614(1)-614(2). FIG. 7A illustrates one example of leader logic circuitry 620. In one example, leader component 604 (FIGS. 6A-6B and 6E) and leader device 610 (FIG. 6C) include leader logic circuitry 620. Leader logic circuitry 620 includes interfaces 622, first address 624, and sensor circuitry 626. In one example, interfaces 622 include an I2C interface for communicating via communication bus 602 (FIGS. 6A-6E), and may include an additional interface for communicating via communication link 608 (FIGS. 6B and 6C). One or more of the interfaces 622 may be incorporated into the sensor circuitry 626. In one example, the sensor circuitry 626 includes reconfigurable second address 628, sensor 605, and registers 632. In one example, registers 632 include registers for enabling and configuring sensor 605, and storing sensor information generated by sensor 605.

In one example, first address 624 and reconfigurable second address 628 are I2C communication addresses. In other examples, first address 624 and reconfigurable second address 628 may be another type of communication address. The leader logic circuitry 620 is addressable via the first address 624. In one example, the first address 624 is a fixed default address value (e.g., "hard-wired") that is intended to remain the same address during the lifetime of the leader logic circuitry 620. In example systems where a plurality of leader logic circuits 620 are to be connected to a single print apparatus, there may be a corresponding plurality of different first addresses.

The leader logic circuitry 620 is also addressable via the reconfigurable second address 628. In the illustrated example, the reconfigurable second address 628 is associated with the sensor circuitry 626. In one example, the reconfigurable second address 628 has a default second address value, while the reconfigurable second address 628 may be reconfigurable to a temporary (e.g., third) address value. In this example, the sensor circuitry 626 is addressable via the reconfigurable second address 628. In some examples, when the sensor circuitry 626 is activated or enabled, it may have the default second address value. The sensor circuitry 626 may receive instructions from a master or host logic circuitry (e.g., a print apparatus logic circuit) to change the default second address value to a temporary address value. In some examples, the temporary address value may be an address that is selected by the print apparatus logic circuit. In example systems where a plurality of leader logic circuits 620 are to be connected to a single print apparatus, the leader logic circuits 620 may all have the same default second address value, and may all have a different temporary address value.

FIG. 8 illustrates a table with example address names for multiple replaceable print apparatus components. Multiple replaceable print apparatus components may be incorporated into a single print apparatus, and such components may all include a first default address (e.g., first address 624 or 644) that may have a preconfigured, default first address value, and a reconfigurable second address (e.g., second address 628 or 646) that may have either a default second address value or a temporary address value after reconfiguration by the print apparatus logic circuit. In the illustrated example, the components include first replaceable print apparatus component 902(1), other replaceable print apparatus component 902(2), and further replaceable print apparatus component 902(3). The first replaceable print apparatus component 902(1) includes first default address 904(1), second default address 906(1), and third/reconfigured/temporary address 908(1). The other replaceable print apparatus component 902(2) includes other first default address 904(2), second default address 906(2), and third/reconfigured/temporary address 908(2). The further replaceable print apparatus component 902(3) includes further first default address 904(3), second default address 906(3), and further third/reconfigured/temporary address 908(3).

In one example, the first default addresses 904(1)-904(3) are pre-configured or fixed addresses that are different for each of the components 902(1)-902(3). In one example, the second default addresses 906(1)-906(3) are pre-configured or fixed addresses that are the same for each of the components 902(1)-902(3). In one example, the addresses 908(1)-908(3) are reconfigurable temporary addresses that are configured by the print apparatus logic circuit, and in an example of this disclosure chosen to be different for each of the components 902(1)-902(3).

Returning to FIG. 7A, in operation according to one example, a print apparatus circuit sends requests to leader logic circuitry 620 to change the reconfigurable second address 628 from the default second address value to a temporary address value, and to write to registers 632 to enable and configure the sensor 605 to generate sensor information. The print apparatus circuit may then send a request for sensor information using the temporary address value to direct the request to the sensor circuitry 626. The sensor circuitry 626 will receive the request, and in response, cause the sensor 605 to generate sensor information. In one example, the sensor circuitry 626 may store sensor measurement information in registers 632, and send the sensor measurement information from the registers 632 to the print apparatus circuit (e.g., via communication bus 602).

In one example, sensor 605 may be a sensor to detect a prime event (e.g., strain gauge sensor), and the sensor circuitry 626 may receive a plurality of commands to capture and return pressure sensor values that are conditioned by a series of pressurizations. In another example, sensor 605 may be an ink level sensor, and the sensor circuitry 626 may receive a plurality of commands to capture and return ink level values. In another example, the sensor 605 may be a temperature sensor. In again other examples, the sensor 605 may include a plurality of different sensor types including these sensor types whereby each sensor type may comprise one or more sensor cells.

Figure 7B:
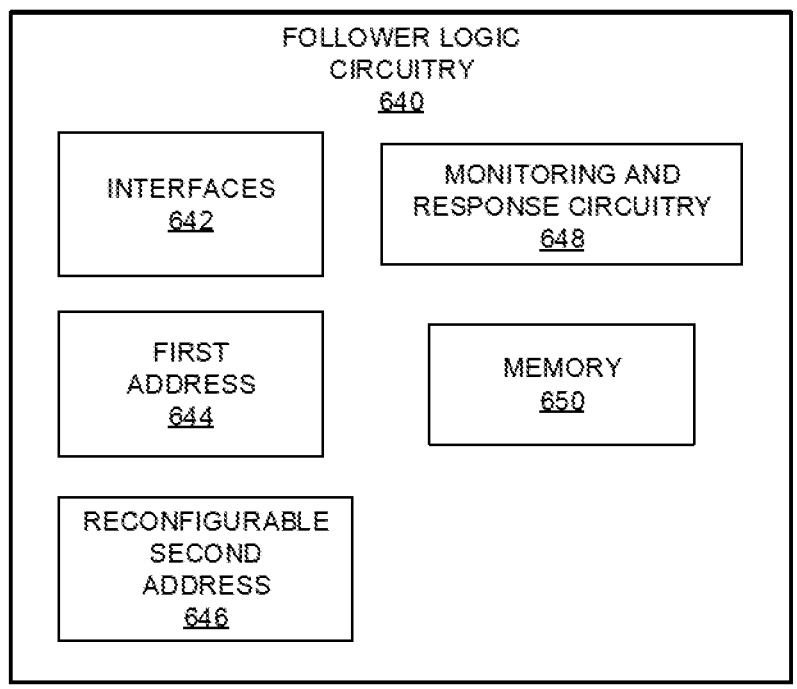
FIG. 7B illustrates one example of follower logic circuitry.

FIG. 7B illustrates one example of follower logic circuitry 640. In one example, each of the follower components 606(1)-606(4) (FIGS. 6A-6C) include follower logic circuitry 640. Follower logic circuitry 640 includes interfaces 642, first address 644, reconfigurable second address 646, monitoring and response circuitry 648, and memory 650. In one example, interfaces 642 include an I2C interface for communicating via communication bus 602 (FIGS. 6A-6E), and may include an additional interface for communicating via communication link 608 (FIGS. 6B and 6C). In one example, follower logic circuitry 640 is digital-only, and does not include an analog sensor.

In one example, first address 644 and reconfigurable second address 646 are I2C communication addresses. In other examples, first address 644 and reconfigurable second address 646 may be another type of communication address. The follower logic circuitry 640 is addressable via the first address 644. In one example, the first address 644 is a fixed default address value (e.g., "hard-wired") that is intended to remain the same address during the lifetime of the follower logic circuitry 640. In example systems where a plurality of follower logic circuits 640 are to be connected to a single print apparatus, there may be a corresponding plurality of different first addresses. In certain examples of this disclosure, logic circuitry of the leader and/or follower component may store instructions (in a memory) to instruct a processor to respond to commands to a default first address, a default second address, and to a third address (i.e., the temporary second address) after reconfiguration by a command to the default second address, without necessarily having a hardwired or reconfigurable address field, but rather, by monitoring the addresses and responding based on these instructions.

The follower logic circuitry 640 is also addressable via the reconfigurable second address 644, which may be reconfigured to a temporary address (e.g., third address). In one example, the second address 644 has a default address value out-of-reset, while the second address 644 may be reconfigurable to a temporary address value. The follower logic circuitry 640 may receive instructions from a master or host logic circuitry (e.g., a print apparatus logic circuit) to change the default second address value to a temporary address value. In some examples, the temporary address value may be an address that is selected by the print apparatus logic circuit. In example systems where a plurality of follower logic circuits 640 are to be connected to a single print apparatus, the follower logic circuits 640 may all have the same default second address value, and may all be reconfigured by the print apparatus logic circuit to a different temporary address value.

In operation according to one example, monitoring and response circuitry 648 monitors the communication bus 602 via one of the interfaces 642 for commands directed to addresses (e.g., first address 624 and reconfigurable second address 628 of leader logic circuitry 620) other than its own addresses (e.g., first address 644 and/or reconfigurable second address 646), and also monitors corresponding responses to those commands. The monitored communications may include commands and responses related to enabling and configuring sensor 605, as well as commands and responses related to causing sensor 605 to generate sensor information. Monitoring and response circuitry 648 may store the monitored commands and/or corresponding responses in memory 650, and/or may store timing information for the commands and responses in memory 650. In some examples, monitoring and response circuitry 648 may store an approximation or condensed summary of the commands and/or responses in memory 650.

In response to commands directed to the address 644 or 646 of the follower logic circuitry 640, the monitoring and response circuitry 648 may access memory 650 and mimic previously monitored responses corresponding to such commands, or may output a pre-stored response sequence upon detecting a specific type of command (e.g., a prime command). The monitoring and response circuitry 648 may also access the timing information stored in memory 650, and mimic the timing of previously monitored communications. The stored timing information may be used for timing/triggers of pre-stored responses. The monitoring and response circuitry 648 may also make modifications to monitored responses to produce its own responses (e.g., adding some noise to response values, choosing modified baseline values, or making other modifications to response values).

By monitoring and mimicking responses of the leader logic circuitry 620, the follower logic circuitry 640 may provide valid sensor values without the expense of including an analog sensor to generate those values. For example, when requested to return a series of strain gauge sensor values, a response may include a number of "baseline" readings (i.e., in a resting state, before the pressurization has actually occurred), followed by a series of readings that match the pressurization spikes. The monitoring and response circuitry 648 can monitor the responses of other components that include leader logic circuitry 620, and when the circuitry 648 sees a component that has begun to deviate from its baseline readings, the circuitry 648 can copy those responses, or use them as a trigger for its own pre-stored responses.

In one example, a command, such as a write command, sent from a print apparatus logic circuit to leader logic circuitry 620 or follower logic circuitry 640, may include an address frame that identifies a communication address of the intended destination of the command (e.g., a first address 624 or 644, or a reconfigurable second address 628 or 646), a sub-address frame that identifies a memory or register address (e.g., an address of one of the registers 632) at the intended destination, and a value frame that identifies a value to write to the register identified by the sub-address frame. Acknowledge bits may be provided between frames, and certain other bits may be included in the command, such as start bits, stop bits, and/or other bits. The command structure may follow an I2C communication protocol.

By looking at the address frame of all commands sent from the print apparatus logic circuit, the monitoring and response circuitry 648 can see which one of the components is being addressed. The monitoring and response circuitry 648 can also determine the function/meaning of the various registers 632 by looking at the sub-address and value frames of commands and the corresponding responses to the commands. This information helps the monitoring and response circuitry 648 to monitor what is occurring between the print apparatus logic circuit and the other components in order to provide valid responses.

In one example, communications between the print apparatus logic circuit and the leader logic circuitry 620 involving the first address 624 include a command from the print apparatus logic circuit indicating a time period in which the leader logic circuitry 620 is accessible via the reconfigurable second address 628. In one example, communications between the print apparatus logic circuit and the follower logic circuitry 640 involving the first address 644 include a command from the print apparatus logic circuit indicating a time period in which the follower logic circuitry 640 is accessible via the reconfigurable second address 646.

In one example, communications between the print apparatus logic circuit and the leader logic circuitry 620 involving the first address 624, and communications between the print apparatus logic circuit and the follower logic circuitry 640 involving the first address 644, are cryptographically authenticated communications. In one example, communications between the print apparatus logic circuit and the leader logic circuitry 620 involving the reconfigurable second address 628, and communications between the print apparatus logic circuit and the follower logic circuitry 640 involving the reconfigurable second address 646, are not encrypted and are non-cryptographically authenticated communications.

In one example, monitoring and response circuitry 648 monitors cryptographically authenticated communications from a print apparatus logic circuit to the first address 624 of the leader logic circuitry 620, and monitors cryptographically authenticated responses to these communications provided by the leader logic circuitry 620. These monitored communications may include a command from the print apparatus logic circuit that indicates a time period in which the leader logic circuitry 620 is accessible via the reconfigurable second address 628. Monitoring and response circuitry 648 next monitors non-cryptographically authenticated communications from a print apparatus logic circuit to the reconfigurable second address 628 of the leader logic circuitry 620, and monitors non-cryptographically authenticated responses to these communications provided by the leader logic circuitry 620.

In one example, the monitored non-cryptographically authenticated communications include a command-response sequence to register addresses of registers 632. The monitoring and response circuitry 648 may distinguish the leader logic circuitry 620 from follower components by detecting that the response data in the command-response sequence for the leader logic circuitry 620 will be changing, whereas the response data may not be initially changing for the follower components. The monitoring and response circuitry 648 may store the command-response sequence in memory 650. In some examples, the monitoring and response circuitry 648 may store an approximation or condensed summary of the command-response sequence in memory 650.

After monitoring the communications of the leader logic circuitry 620, the follower logic circuitry 640 may receive cryptographically authenticated communications from the print apparatus logic circuit to the first address 644 of the follower logic circuitry 640, followed by non-cryptographically authenticated communications from the print apparatus logic circuit to the reconfigurable second address 646 of the follower logic circuitry 640, including commands from the print apparatus logic circuit that specify addresses of registers. If the monitoring and response circuitry 648 determines that the specified register addresses match the register addresses in the command-response sequence information stored in memory 650, the monitoring and response circuitry 648 responds to the print apparatus logic circuit with the stored response values, or a modified version of the stored response values, or pre-stored response values. In one example, the monitoring and response circuitry 648 copies only certain response values from leader logic circuitry 620 associated with a predetermined subset of queries, such as sensor communications. Response values for other queries may be pre-stored in memory 650 (e.g., Revision ID, Cell Count, Clock Speed, etc.).

In some examples, monitoring and response circuitry 648 performs the following: (1) monitoring of serial communications including cryptographically authenticated communications to first address 624 of circuitry 620, which may include time/enable commands to first address 624 of circuitry 620; (2) monitoring of serial communications including non-cryptographically authenticated communications, which may include communications regarding reconfigurable second address 628 of circuitry 620, register queries to registers 632 of circuitry 620, and responses from circuitry 620 to the register queries; (3) in response to the queries and responses, storing response values; and (4) in response to the same or similar communications to first address 644 and then to reconfigurable second address 646, outputting the stored response values corresponding to the queries.

Figure 7C:
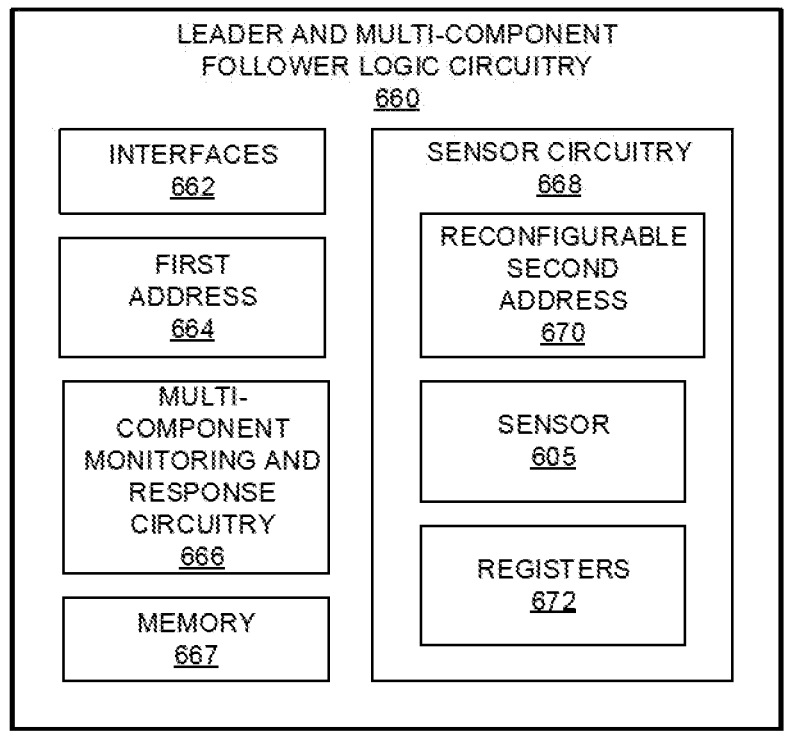
FIG. 7C illustrates one example of leader and multi-component follower logic circuitry.

FIG. 7C illustrates one example of leader and multi-component follower logic circuitry 660. In one example, leader and multi-component follower component 612 (FIG. 6D) includes logic circuitry 660. Logic circuitry 660 includes interfaces 662, first address 664, multi-component monitoring and response circuitry 666, memory 667, and sensor circuitry 668. In one example, interfaces 662 include an I2C interface for communicating via communication bus 602 (FIGS. 6A-6E), and may include an additional interface for communicating via communication link 608 (FIGS. 6B and 6C). One or more of the interfaces 662 may be incorporated into the sensor circuitry 668. In one example, the sensor circuitry 668 includes reconfigurable second address 670, sensor 605, and registers 672. In one example, registers 672 include registers for enabling and configuring sensor 605, and storing sensor information generated by sensor 605.

In one example, first address 664 and reconfigurable second address 670 are I2C communication addresses. In other examples, first address 664 and reconfigurable second address 670 may be another type of communication address. The logic circuitry 660 is addressable via the first address 664. In one example, the first address 664 is a fixed default address value (e.g., "hard-wired") that is intended to remain the same address during the lifetime of the logic circuitry 660. In example systems where a plurality of replaceable print apparatus components are to be connected to a single print apparatus, there may be a corresponding plurality of different first addresses.

The logic circuitry 660 is also addressable via the reconfigurable second address 670, which may be reconfigured to a temporary address (e.g., third address). In the illustrated example, the reconfigurable second address 670 is associated with the sensor circuitry 668. In one example, the reconfigurable second address 670 has a default second address value, while the reconfigurable second address 670 may be reconfigurable to a temporary (e.g., third) address value. In this example, the sensor circuitry 668 is addressable via the reconfigurable second address 670. In some examples, when the sensor circuitry 668 is activated or enabled, it may have the default second address value. The sensor circuitry 668 may receive instructions from a master or host logic circuitry (e.g., a print apparatus logic circuit) to change the default second address value to a temporary address value. In some examples, the temporary address value may be an address that is selected by the print apparatus logic circuit. In example systems where a plurality of replaceable print apparatus components are to be connected to a single print apparatus, each of the components may be associated with the same default second address value, and these addresses may all be reconfigured to have a corresponding plurality of different temporary address values.

In operation according to one example, a print apparatus circuit sends requests to logic circuitry 660 to change the reconfigurable second address 670 from the default second address value to a temporary address value, and to write to registers 672 to enable and configure the sensor 605 to generate sensor information. The print apparatus circuit may then send a request for sensor information using the temporary address value to direct the request to the sensor circuitry 668. The sensor circuitry 668 will receive the request, and in response, cause the sensor 605 to generate sensor information. In one example, the sensor circuitry 668 may store sensor measurement information in registers 672, and send the sensor measurement information from the registers 672 to the print apparatus circuit (e.g., via communication bus 602).

For communications directed to the addresses of the logic circuitry 660 (e.g., first address 664 and/or reconfigurable second address 670), multi-component monitoring and response circuitry 666 may store the commands and/or corresponding responses of the logic circuitry 660 in memory 667, and/or may store timing information for the commands and responses in memory 667. In some examples, multi-component monitoring and response circuitry 666 may store an approximation or condensed summary of the commands and/or responses in memory 667.

Multi-component monitoring and response circuitry 666 also monitors the communication bus 602 via one of the interfaces 662 for commands directed to addresses (e.g., a first address and a reconfigurable second address associated with each of the components 614(1)-614(3) (FIG. 6D)) other than the addresses of the logic circuitry 660 (e.g., first address 664 and/or reconfigurable second address 670), and sends responses to those commands on behalf of the components 614(1)-614(3). The monitored communications may include commands related to enabling and configuring a sensor, as well as commands related to causing the sensor to generate sensor information.

In response to commands directed to an address associated with one of the components 614(1)-614(3), the multi-component monitoring and response circuitry 666 may access the memory 667 and mimic previous responses of the logic circuitry 660 corresponding to such commands, or may output a pre-stored response sequence upon detecting a specific type of command (e.g., a prime command). The multi-component monitoring and response circuitry 666 may also access the timing information stored in memory 667, and mimic the timing of previous communications. The stored timing information may be used for timing/triggers of pre-stored responses. The multi-component monitoring and response circuitry 666 may also make modifications to previous responses to produce modified responses (e.g., adding some noise to response values, choosing modified baseline values, or making other modifications to response values).

The multi-component monitoring and response circuitry 666 may also cause sensor 605 to generate sensor information in response to a command directed to one of the components 614(1)-614(3), and send the sensor information to the print apparatus logic circuit on behalf of that one of the components 614(1)-614(3). The multi-component monitoring and response circuitry 666 may provide valid sensor values on behalf of the components 614(1)-614(3) without the expense of including an analog sensor in each of the components 614(1)-614(3) to generate those values.

In one example, sensor 605 may be a sensor to detect a prime event (e.g., strain gauge sensor), and the sensor circuitry 668 may receive a plurality of commands to capture and return pressure sensor values that are conditioned by a series of pressurizations. In another example, sensor 605 may be an ink level sensor, and the sensor circuitry 668 may receive a plurality of commands to capture and return ink level values. In another example, the sensor 605 may be a temperature sensor. In again other examples, the sensor 605 may include a plurality of different sensor types including these sensor types whereby each sensor type may comprise one or more sensor cells.

A slave device connected to an I2C bus may ignore commands that are not directed to that device's communication address. However, in some examples, rather than ignore such commands, circuitry 660 responds to commands directed to its own communication addresses, as well as other communication addresses (e.g., addresses that the print apparatus logic circuit may associate with other replaceable print apparatus components). This allows circuitry 660 to concurrently emulate the presence of multiple replaceable print apparatus components to the host printer.

In some examples, circuitry 660 listens to and responds to all I2C addresses used by a set of replaceable print apparatus components (e.g., supplies). In one example, circuitry 660 listens to and responds to all I2C addresses used by a set of four replaceable print apparatus components. In some examples, circuitry 660 is capable of initiating and maintaining at least four sessions concurrently with the host printer. Circuitry 660 may contain multiple personalities (e.g., emulation of multiple supplies of different colors) and is configured to determine when to present the host with a new personality. Circuitry 660 may contain or deduce a timer function or functions to enable it to respond correctly to certain commands. Circuitry 660 may include a switch that can be used to enable a sensor or sensors, which collectively provide input that can be evaluated by the circuitry 660. In some examples, circuitry 660 may act as an automatic reset chip, triggering a change in personality on power up immediately following the recording of specific low on ink data from the print apparatus logic circuit. For example, this may occur after a sensor within the printhead assembly detects an out of ink condition causing firmware to record the event in memory.

Figure 7D:
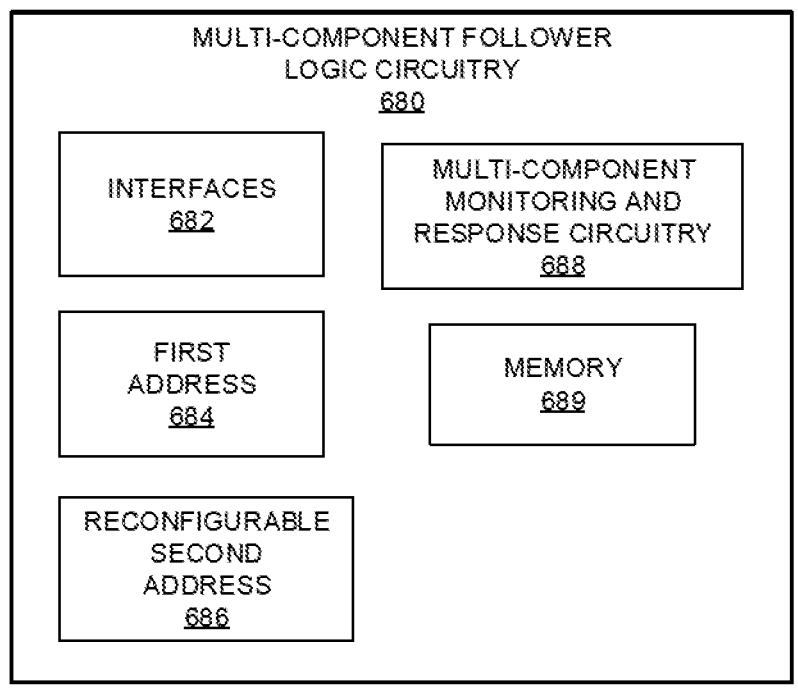
FIG. 7D illustrates one example of multi-component follower logic circuitry.

FIG. 7D illustrates one example of multi-component follower logic circuitry 680. In one example, multi-component follower component 616 (FIG. 6E) includes logic circuitry 680. Logic circuitry 680 includes interfaces 682, first address 684, reconfigurable second address 686, multi-component monitoring and response circuitry 688, and memory 689. In one example, interfaces 682 include an I2C interface for communicating via communication bus 602 (FIGS. 6A-6E), and may include an additional interface for communicating via communication link 608 (FIGS. 6B and 6C). In one example, logic circuitry 680 is digital-only, and does not include an analog sensor.

In one example, first address 684 and reconfigurable second address 686 are I2C communication addresses. In other examples, first address 684 and reconfigurable second address 686 may be another type of communication address. The logic circuitry 680 is addressable via the first address 684. In one example, the first address 684 is a fixed default address value (e.g., "hard-wired") that is intended to remain the same address during the lifetime of the logic circuitry 680. In example systems where a plurality of replaceable print apparatus components are to be connected to a single print apparatus, there may be a corresponding plurality of different first addresses.

The logic circuitry 680 is also addressable via the reconfigurable second address 686, which may be reconfigured to a temporary address (e.g., third address). In one example, the second address 686 has a default address value out-of-reset, while the second address 686 may be reconfigurable to a temporary address value. The logic circuitry 680 may receive instructions from a master or host logic circuitry (e.g., a print apparatus logic circuit) to change the default second address value to a temporary address value. In some examples, the temporary address value may be an address that is selected by the print apparatus logic circuit. In example systems where a plurality of replaceable print apparatus components are to be connected to a single print apparatus, each of the components may be associated with the same default second address value, and these addresses may all be reconfigured to have a corresponding plurality of different temporary address values.

In operation according to one example, multi-component monitoring and response circuitry 688 monitors the communication bus 602 via one of the interfaces 682 for commands directed to addresses (e.g., a first address and a reconfigurable second address of leader component 604 (FIG. 6E)) other than its own addresses (e.g., first address 684 and/or reconfigurable second address 686), and also monitors corresponding responses to those commands. The monitored communications may include commands and responses related to enabling and configuring sensor 605, as well as commands and responses related to causing sensor 605 to generate sensor information. Monitoring and response circuitry 688 may store the monitored commands and/or corresponding responses in memory 689, and/or may store timing information for the commands and responses in memory 689. In some examples, monitoring and response circuitry 688 may store an approximation or condensed summary of the commands and/or responses in memory 689.

In response to commands directed to the address 684 or 686 of the logic circuitry 680, the monitoring and response circuitry 688 may access memory 689 and mimic previously monitored responses corresponding to such commands, or may output a pre-stored response sequence upon detecting a specific type of command (e.g., a prime command). The monitoring and response circuitry 688 may also access the timing information stored in memory 689, and mimic the timing of previously monitored communications. The stored timing information may be used for timing/triggers of pre-stored responses. The monitoring and response circuitry 688 may also make modifications to monitored responses to produce its own responses (e.g., adding some noise to response values, choosing modified baseline values, or making other modifications to response values).

Multi-component monitoring and response circuitry 688 also monitors the communication bus 602 via one of the interfaces 682 for commands directed to addresses (e.g., a first address and a reconfigurable second address associated with each of the components 614(1)-614(2) (FIG. 6E)) other than the addresses of the logic circuitry 680 (e.g., first address 684 and/or reconfigurable second address 686), and sends responses to those commands on behalf of the components 614(1)-614(2). The monitored communications directed to components 614(1)-614(2) may include commands related to enabling and configuring a sensor, as well as commands related to causing the sensor to generate sensor information.

In response to commands directed to an address associated with one of the components 614(1)-614(2) (FIG. 6E), the monitoring and response circuitry 688 may access the memory 689 and mimic previously monitored responses corresponding to such commands, or may output a pre-stored response sequence upon detecting a specific type of command (e.g., a prime command). The monitoring and response circuitry 688 may also access the timing information stored in memory 689, and mimic the timing of previous communications. The stored timing information may be used for timing/triggers of pre-stored responses. The monitoring and response circuitry 688 may also make modifications to previous responses to produce modified responses (e.g., adding some noise to response values, choosing modified baseline values, or making other modifications to response values).

By monitoring and mimicking responses of the leader component 604 (FIG. 6E), the monitoring and response circuitry 688 may provide valid sensor values for itself, as well as on behalf of the components 614(1)-614(2) without the expense of including an analog sensor in each of the components 614(1)-614(2) and 616 to generate those values. A slave device connected to an I2C bus may ignore commands that are not directed to that device's communication address. However, in some examples, rather than ignore such commands, circuitry 680 responds to commands directed to its own communication addresses, as well as other communication addresses (e.g., addresses that the print apparatus logic circuit may associate with other replaceable print apparatus components). This allows circuitry 680 to concurrently emulate the presence of multiple replaceable print apparatus components to the host printer.

In some examples, circuitry 680 listens to and responds to all I2C addresses used by a set of replaceable print apparatus components (e.g., supplies). In some examples, circuitry 680 is capable of initiating and maintaining at least four sessions concurrently with the host printer. Circuitry 680 may contain multiple personalities (e.g., emulation of multiple supplies of different colors) and is configured to determine when to present the host with a new personality. Circuitry 680 may contain or deduce a timer function or functions to enable it to respond correctly to certain commands. Circuitry 680 may include a switch that can be used to enable a sensor or sensors, which collectively provide input that can be evaluated by the circuitry 680. In some examples, circuitry 680 may act as an automatic reset chip, triggering a change in personality on power up immediately following the recording of specific low on ink data from the print apparatus logic circuit. For example, this may occur after a sensor within the printhead assembly detects an out of ink condition causing firmware to record the event in memory.

Figure 9A:
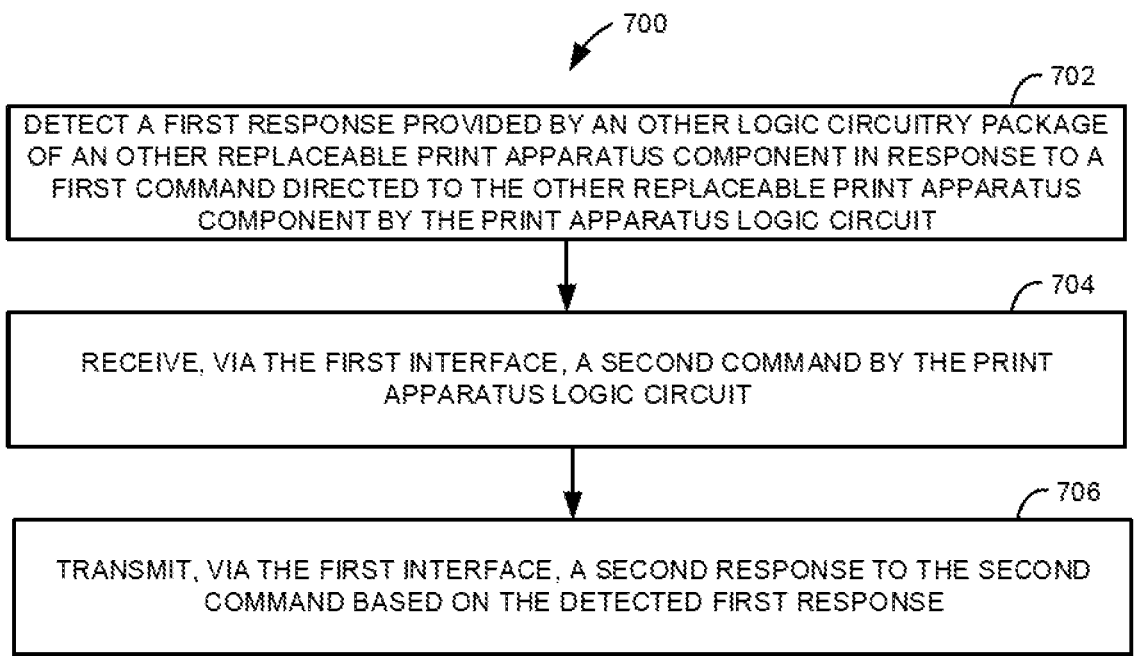
FIGS. 9A-9H are flow diagrams illustrating one example of a method that may be carried out by a logic circuitry package.

FIGS. 9A-9H are flow diagrams illustrating one example of a method 700 that may be carried out by a logic circuitry package, such as logic circuitry package 400a-400d, or by circuitry 424, 620, 640, 660, or 680. Method 700 may be carried out by a replaceable print apparatus component that includes a logic circuitry package. The logic circuitry package may include a first interface to communicate with a print apparatus logic circuit, and a logic circuit. As illustrated in FIG. 9A at 702, the logic circuit of the logic circuitry package may detect a first response provided by an other logic circuitry package of an other replaceable print apparatus component in response to a first command directed to the other replaceable print apparatus component by the print apparatus logic circuit. At 704, the logic circuit receives, via the first interface, a second command by the print apparatus logic circuit. At 706, the logic circuit transmits, via the first interface, a second response to the second command based on the detected first response.

Figure 9B:
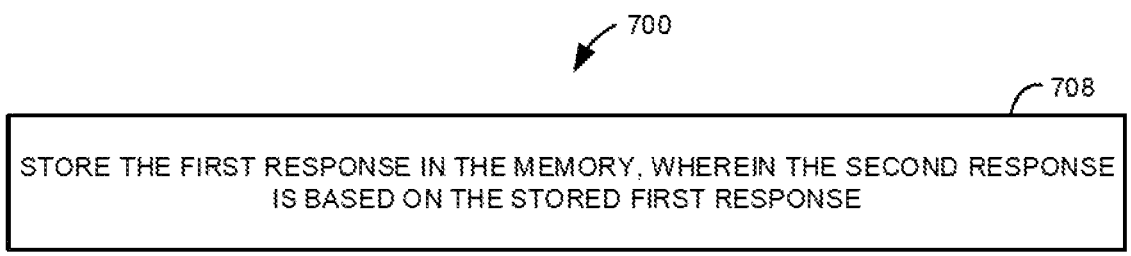

In some examples, the logic circuitry package may include a memory, and, as illustrated in FIG. 9B, at 708, the logic circuit in method 700 may store the first response in the memory, and the second response may be based on the stored first response. In some examples, the logic circuit may store an approximation or condensed summary of the first response in the memory, and the second response may be based on the stored approximation or condensed summary of the first response.

In some examples of method 700, the first command and the second command may each include a series of commands. In some examples, each of the commands may include an I2C address and a register address. In some examples, the first response and the second response may each include a series of responses. In some examples, each of the responses may include a digital count value. The digital count value may represent a natural number of one byte or less.

In some examples of method 700, the first command and the second command may be a same type of command, and the second response may copy information from the first response. In some examples, the first command and the second command may be a same type of command, and the second response may be modified to be similar but not exactly equal to the first response.

Figure 9C:
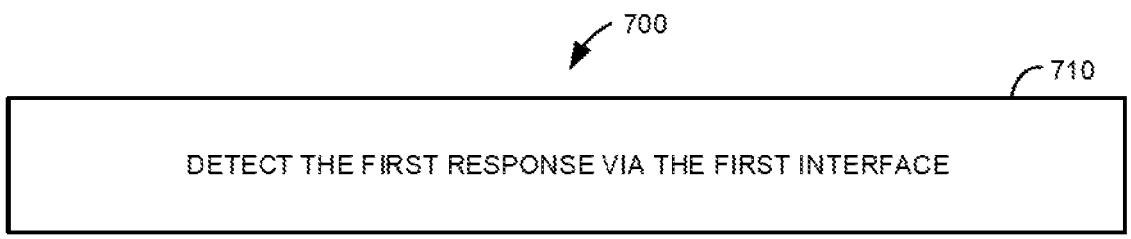

In some examples, as illustrated in FIG. 9C, at 710, the logic circuit may detect the first response via the first interface. In some examples, the first interface may include a power contact and a data contact. In some examples, the first interface may include a ground contact and a clock contact.

Figure 9D:
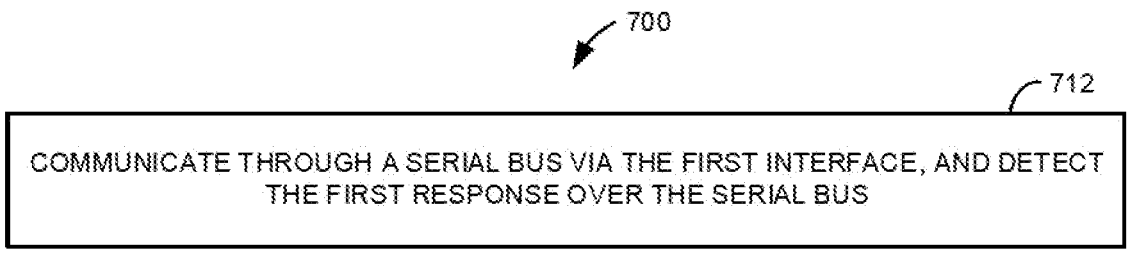

In some examples, as illustrated in FIG. 9D, at 712, the logic circuit may communicate through a serial bus via the first interface, and detect the first response over the serial bus.

Figure 9E:
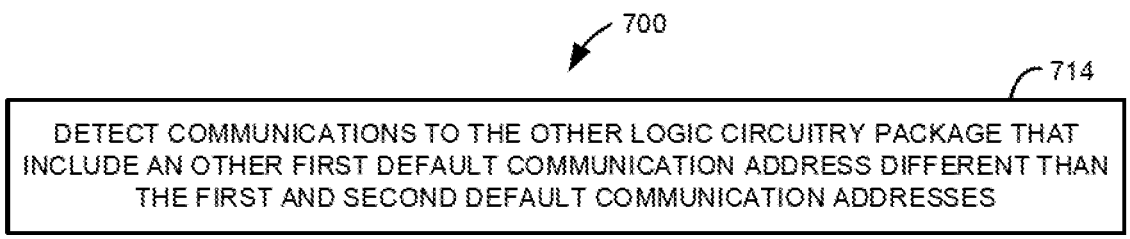

In some examples, the logic circuitry package may include a first default communication address and a second default communication address, and, as illustrated in FIG. 9E, at 714, the logic circuit may detect communications to the other logic circuitry package that include an other first default communication address different than the first and second default communication addresses.

Figure 9F:
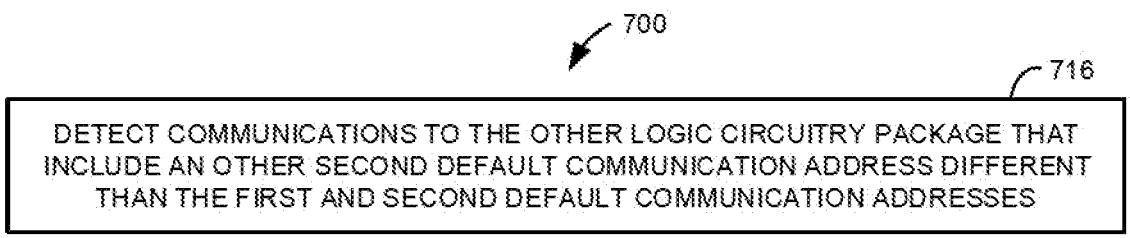

In some examples, as illustrated in FIG. 9F, at 716, the logic circuit may detect communications to the other logic circuitry package that include an other second default communication address different than the first and second default communication addresses.

Figure 9G:
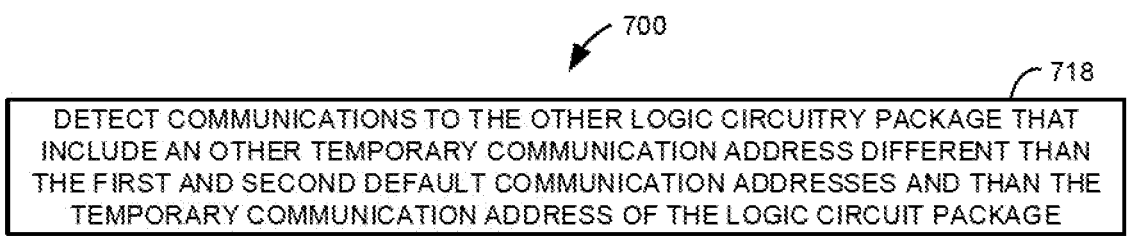

In some examples, the logic circuitry package may include a second temporary communication address, and, as illustrated in FIG. 9G, at 718, the logic circuit may detect communications to the other logic circuitry package that include an other temporary communication address, for example different than the first and second default communication addresses and than the temporary communication address of the logic circuit package.

Figure 9H:
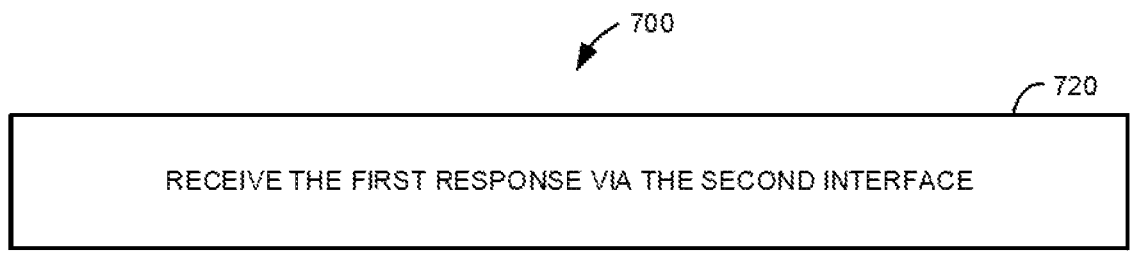

In some examples, the logic circuit may include a second interface coupled to a communication channel connected to the other logic circuitry package, and as illustrated in FIG. 9H, at 720, the logic circuit may receive the first response via the second interface.

In some examples of method 700, the communication channel is not coupled to the print apparatus logic circuit. The second interface may be an I2C interface. The second interface may be a wireless interface. The first interface may be an I2C interface.

Some examples are directed to a plurality of replaceable print apparatus components including the replaceable print apparatus component and the other replaceable print apparatus component of any of the examples described herein, wherein the other replaceable print apparatus component may include an analog sensor, and the first response may include at least one digital value based on the analog sensor. The analog sensor may be one of an ink level sensor, a pressure sensor, or a temperature sensor. The other logic circuitry package may include an I2C interface to connect to the print apparatus logic circuit via a serial bus, and an other logic circuit and another interface to communicate with the logic circuitry package over a communication channel other than the serial bus. The replaceable print apparatus component may not include any analog sensors.

Figure 10:
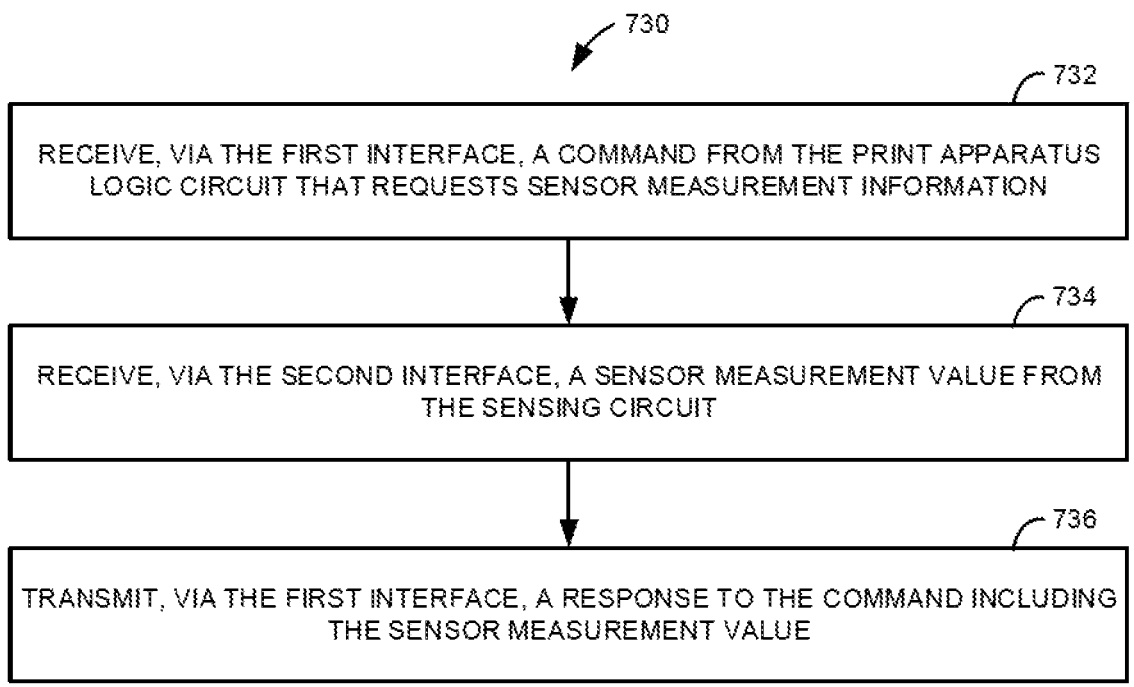
FIG. 10 is a flow diagram illustrating another example of a method that may be carried out by a logic circuitry package.

FIG. 10 is a flow diagram illustrating another example of a method 730 that may be carried out by a logic circuitry package, such as logic circuitry package 400a-400d, or by circuitry 424, 620, 640, 660, or 680. Method 730 may be carried out by a replaceable print apparatus component that includes a logic circuitry package. The logic circuitry package may include a first interface coupled to at least one other replaceable print apparatus component and coupled to a print apparatus logic circuit; a second interface coupled to the at least one other replaceable print apparatus component and coupled to a sensing circuit; and a logic circuit. As illustrated in FIG. 10 at 732, the logic circuit of the logic circuitry package may receive, via the first interface, a command from the print apparatus logic circuit that requests sensor measurement information. At 734, the logic circuit may receive, via the second interface, a sensor measurement value from the sensing circuit. At 736, the logic circuit may transmit, via the first interface, a response to the command including the sensor measurement value.

In some examples of method 730, the second interface may be an I2C interface. The second interface may be a wireless interface. The first interface may be an I2C interface.

Figure 11:
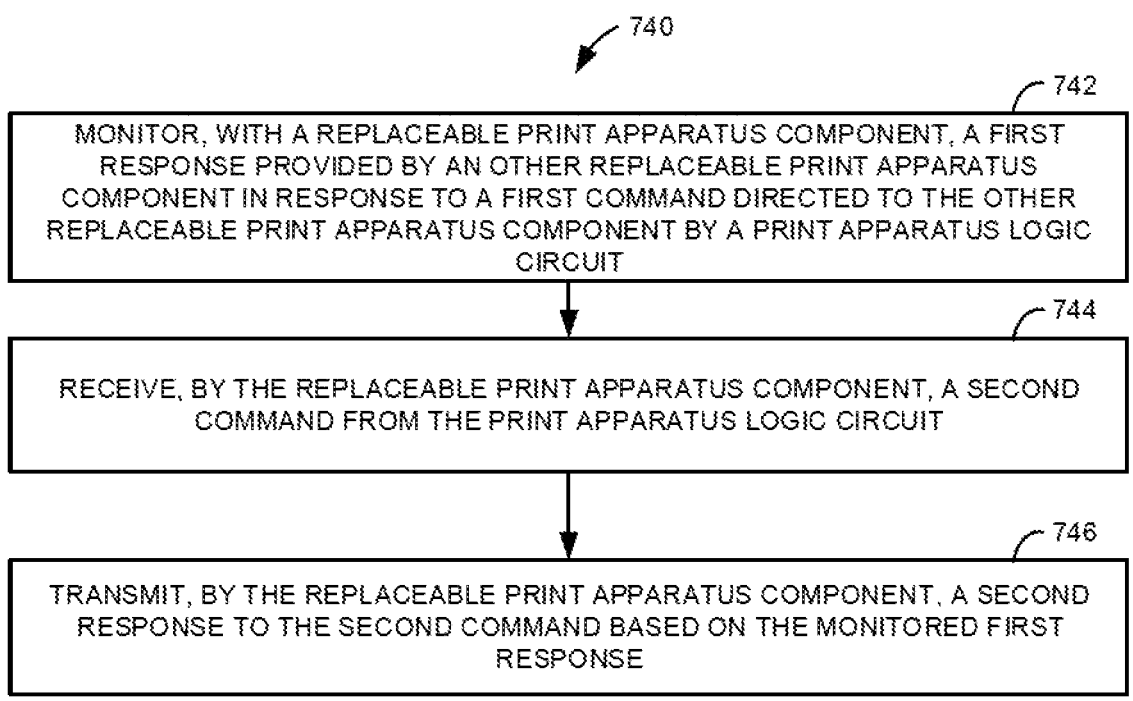
FIG. 11 is a flow diagram illustrating another example of a method that may be carried out by a logic circuitry package.

FIG. 11 is a flow diagram illustrating another example of a method 740 that may be carried out by a logic circuitry package, such as logic circuitry package 400a-400d, or by circuitry 424, 620, 640, 660, or 680. As illustrated in FIG. 11, at 742, method 740 includes monitoring, with a replaceable print apparatus component, a first response provided by an other replaceable print apparatus component in response to a first command directed to the other replaceable print apparatus component by a print apparatus logic circuit. At 744, method 740 includes receiving, by the replaceable print apparatus component, a second command from the print apparatus logic circuit. At 746, method 740 includes transmitting, by the replaceable print apparatus component, a second response to the second command based on the monitored first response.

In some examples of method 740, the other replaceable print apparatus component may include an analog sensor, and the first response may include sensor information from the analog sensor. The replaceable print apparatus component may not include any analog sensors.

Figure 12:
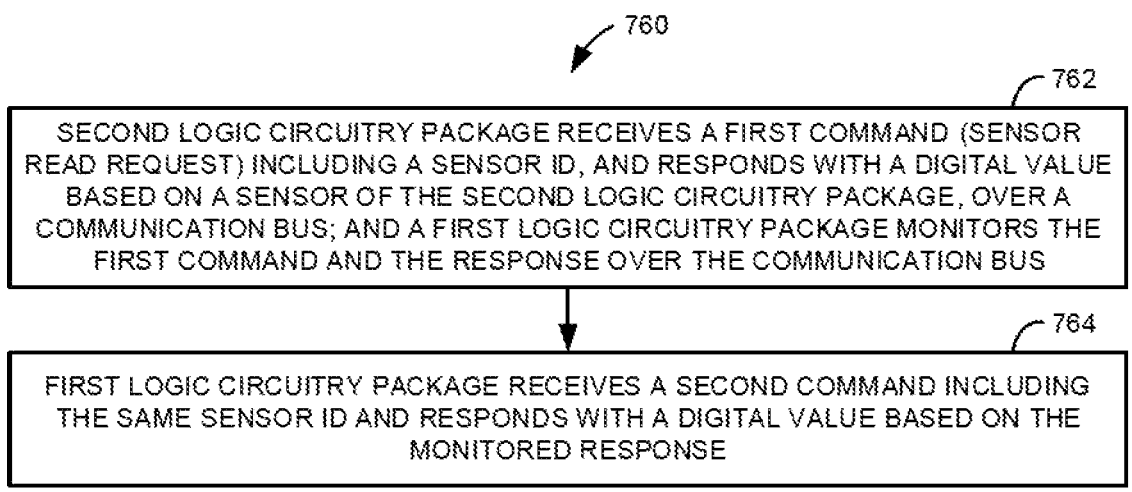
FIG. 12 is a flow diagram illustrating another example of a method that may be carried out by a logic circuitry package.

FIG. 12 is a flow diagram illustrating another example of a method 760 that may be carried out by a logic circuitry package, such as logic circuitry package 400a-400d, or by circuitry 424, 620, 640, 660, or 680. As illustrated in FIG. 12, at 762 in method 760, a second logic circuitry package receives a first command (e.g., a sensor read request) including a sensor ID, and responds with a digital value based on a sensor of the second logic circuitry package, over a communication bus. Also at 762, a first logic circuitry package monitors the first command and the response over the communication bus. At 764, the first logic circuitry package receives a second command including the same sensor ID and responds with a digital value based on the monitored response.

Some examples are directed to a plurality of replaceable print apparatus components installable in different receiving stations of a same print apparatus, including the replaceable print apparatus component and the other replaceable print apparatus component of any example described herein, wherein the other replaceable print apparatus component comprises at least one sensor and provides sensor information from the at least one sensor to the replaceable print apparatus component.

Some examples are directed to a replaceable print apparatus component of any of the examples described herein, which also includes a housing having a height, a width less than the height, and a length greater than the height, the height parallel to a vertical reference axis, and the width extending between two sides; a print liquid reservoir within the housing; a print liquid output; an air input above the print liquid output; and an interface comprising interface pads for communicating with a print apparatus logic circuit, the interface pads provided at an inner side of one of the sides facing a cut-out for a data interconnect to be inserted, the interface pads extending along a height direction near a top and front of the component above the air input, wherein the air input is provided at the front on the same vertical reference axis parallel to the height direction, and wherein the vertical reference axis is parallel to and distanced from an axis that intersects the interface pads.

Figure 13A:
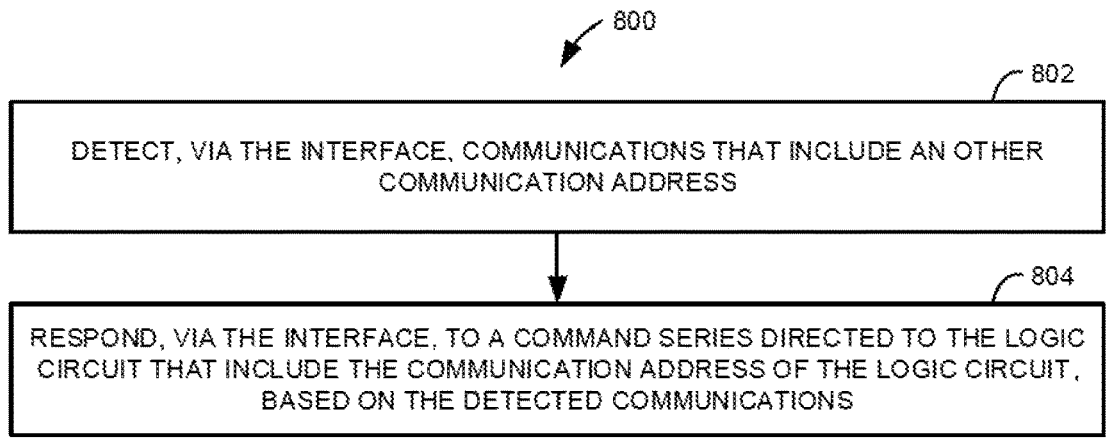
FIGS. 13A-13G are flow diagrams illustrating another example of a method that may be carried out by a logic circuitry package.

FIGS. 13A-13G are flow diagrams illustrating another example of a method 800 that may be carried out by a logic circuitry package, such as logic circuitry package 400*a*-400*d*, or by circuitry 424, 620, 640, 660, or 680. Method 800 may be carried out by a logic circuitry package for a replaceable print apparatus component. The logic circuitry package may include an interface to communicate with a print apparatus logic circuit, and a logic circuit having a communication address to communicate with the print apparatus logic circuit. As illustrated in FIG. 13A, at 802, the logic circuit of the logic circuitry package may detect, via the interface, communications that include an other communication address. At 804, the logic circuit may respond, via the interface, to a command series directed to the logic circuit that include the communication address of the logic circuit, based on the detected communications.

Figure 13B:

In some examples, the logic circuitry package includes a memory, and, as illustrated in FIG. 13B, at 806, the logic circuit may store responses of the detected communications in the memory, and the response to the command series may be based on the stored responses. In some examples, the logic circuit may store an approximation or condensed summary of the responses in the memory, and the response to the command series may be based on the stored approximation or condensed summary of the responses. In some examples, the other communication address is not an address of the logic circuit.

Figure 13C:
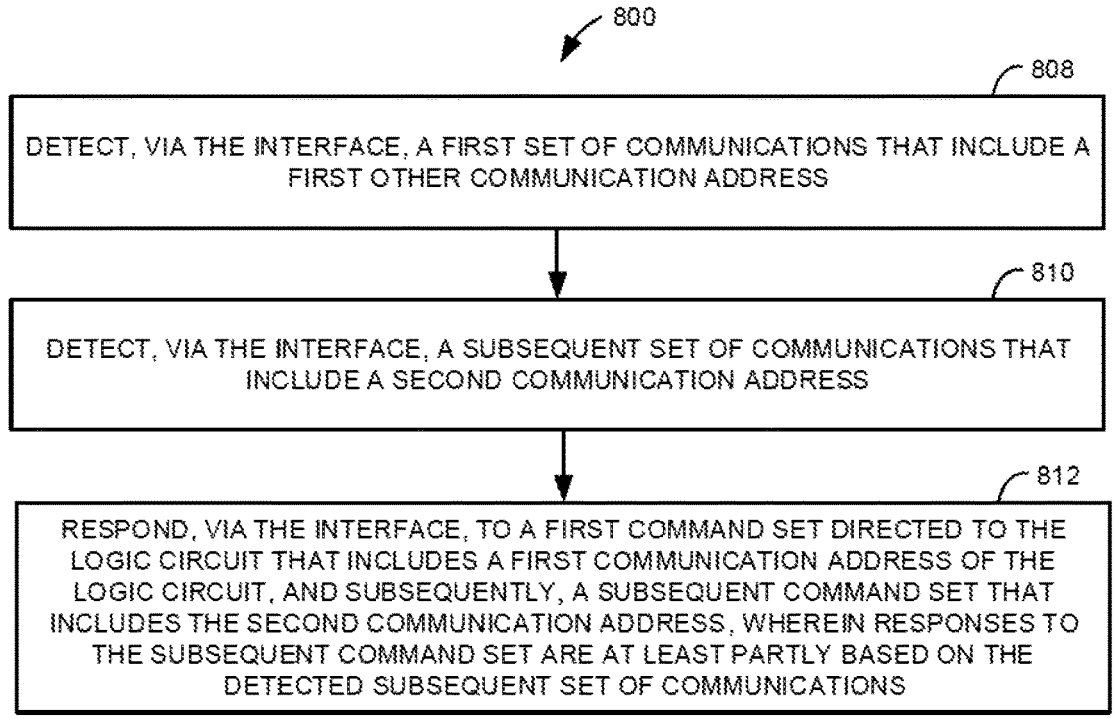

In some examples, as illustrated in FIG. 13C, at 808, the logic circuit may detect, via the interface, a first set of communications that include a first other communication address. At 810, the logic circuit may detect, via the interface, a subsequent set of communications that include a second communication address. At 812, the logic circuit may respond, via the interface, to a first command set directed to the logic circuit that includes a first communication address of the logic circuit, and subsequently, a subsequent command set that includes the second communication, wherein responses to the subsequent command set are at least partly based on the detected subsequent set of communications.

In some examples of method 800, the subsequent set of communications and the subsequent command set each include a third communication address that is a temporary address to temporarily replace the second communication address.

Figure 13D:
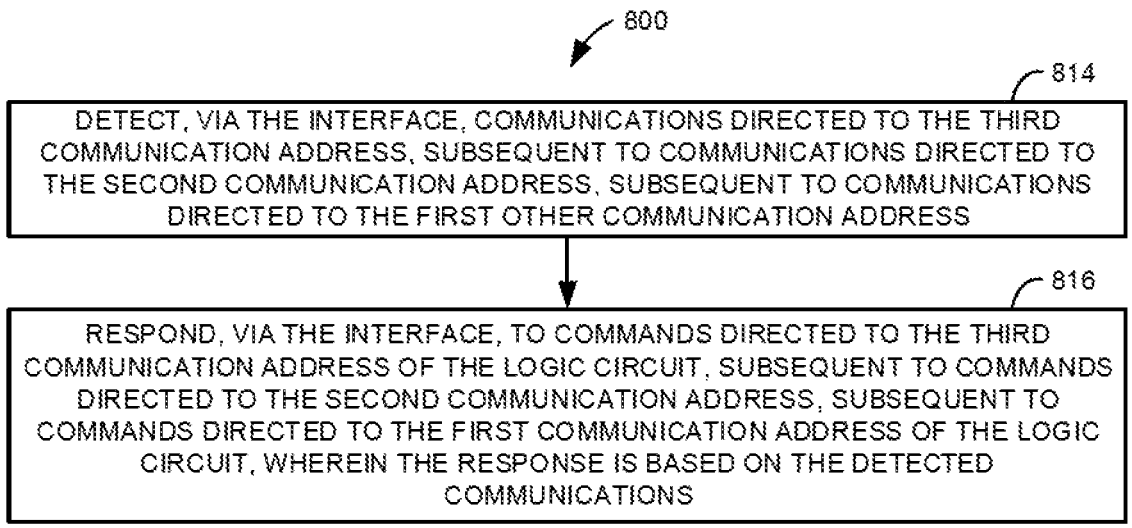

In some examples, as illustrated in FIG. 13D, at 814, the logic circuit may detect, via the interface, communications directed to the third communication address, subsequent to communications directed to the second communication address, subsequent to communications directed to the first other communication address. At 816, the logic circuit may respond, via the interface, to commands directed to the third communication address of the logic circuit, subsequent to commands directed to the second communication address, subsequent to commands directed to the first communication address of the logic circuit, wherein the response is based on the detected communications.

In some examples of method 800, the communications and the commands may include a time parameter that indicates a time period for responding to commands directed to the second communication address, and subsequently, the third communication address.

Figure 13E:
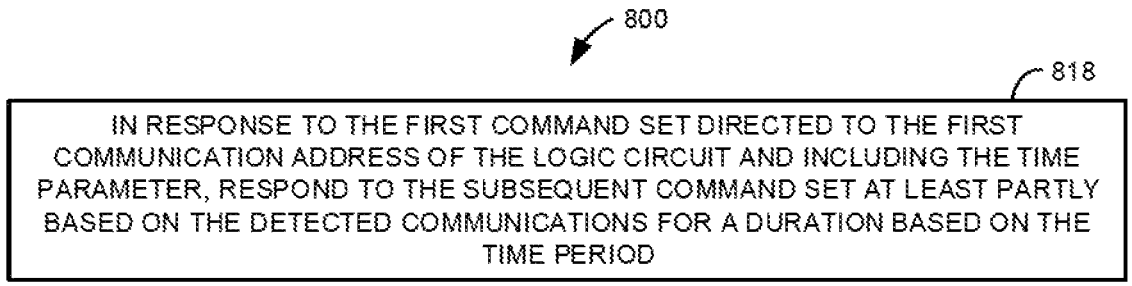

In some examples, as illustrated in FIG. 13E, at 818, the logic circuit may, in response to the first command set directed to the first communication address of the logic circuit and including the time parameter, respond to the subsequent command set at least partly based on the detected communications for a duration based on the time period.

Figure 13F:
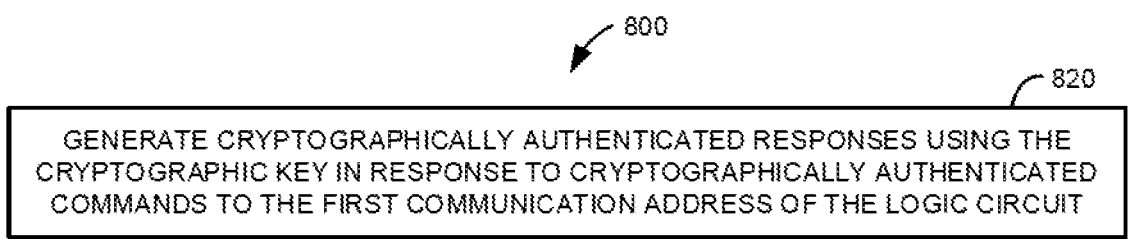

In some examples of method 800, the first set of communications may be cryptographically authenticated using a cryptographic key. In some examples, the logic circuitry package may include a memory storing the cryptographic key, and, as illustrated in FIG. 13F, at 820, the logic circuit may generate cryptographically authenticated responses using the cryptographic key in response to cryptographically authenticated commands to the first communication address of the logic circuit.

In some examples, the subsequent set of communications, including commands and responses, may not be cryptographically authenticated using the cryptographic key.

Figure 13G:
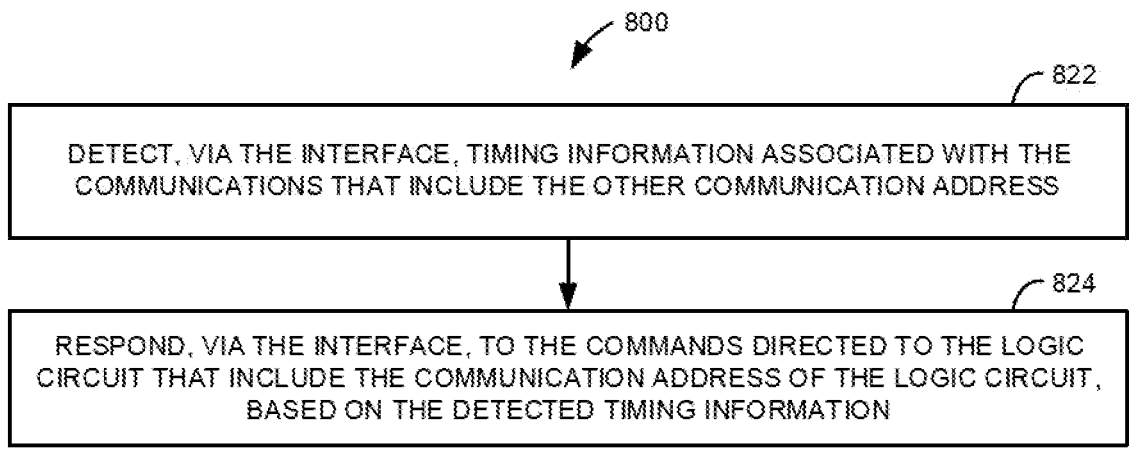

In some examples, as illustrated in FIG. 13G, at 822, the logic circuit may detect, via the interface, timing information associated with the communications that include the other communication address. At 824, the logic circuit may respond, via the interface, to the commands directed to the logic circuit that include the communication address of the logic circuit, based on the detected timing information.

In some examples of method 800, a response to commands directed to the logic circuit may include a response that copies a value specified in the detected communications. A response to commands directed to the logic circuit may include a response that includes a modified version of a value specified in the detected communications. A response to commands directed to the logic circuit may include a response that includes a pre-stored response value.

In some examples of method 800, the logic circuit is configured to respond to commands including sensor IDs with digital count values based on the detected communications. In some examples, the interface may be a serial bus interface. In some examples, the interface may be an I2C serial bus interface.

Some examples are directed to a plurality of logic circuitry packages including at least one logic circuitry package of any of the examples described herein, wherein the logic circuit is configured to monitor a predetermined communication address of at least one other logic circuitry package of the plurality of logic circuitry packages.

Some examples are directed to a logic circuitry package, which includes an I2C interface, and a logic circuit, configured to have a first default communication address, a second default communication address, and a third, temporary communication address, configured to: monitor, via the I2C interface, communications that include a communication address other than the communication address of the logic circuit; and respond, via the I2C interface, to commands directed to the at least one of the communication addresses, based on at least a portion of the monitored communications.

In some examples, the logic circuit may monitor at least one of: a command directed to another default communication address, and including a time period; a command directed to the second default communication address and including a first reconfigured address; commands directed to the first reconfigured address; and responses to the commands directed to the first reconfigured address. In some examples, the logic circuitry package may include a memory, and the logic circuit may at least temporarily store at least part of the responses to the commands directed to the first reconfigured address. The logic circuit may output, in response to a command directed to its default communication address, and including a time period; a command directed to the second communication address and including a second reconfigured address; commands directed to the second reconfigured address; responses based on the responses to commands directed to the first reconfigured address.

Some examples are directed to a replaceable print apparatus component that includes a logic circuitry package of any of the examples described herein. The replaceable print apparatus component may include a housing having a height, a width less than the height, and a length greater than the height, the height parallel to a vertical reference axis, and the width extending between two sides; a print liquid reservoir within the housing; and a print liquid output. In some examples, the replaceable print apparatus component may further include an air input above the print liquid output; and an interface comprising interface pads for communicating with a print apparatus logic circuit, the interface pads provided at an inner side of one of the sides facing a cut-out for a data interconnect to be inserted, the interface pads extending along a height direction near a top and front of the component above the air input, wherein the air input is provided at the front on the same vertical reference axis parallel to the height direction, and wherein the vertical reference axis is parallel to and distanced from an axis that intersects the interface pads.

Some examples are directed to a replaceable print apparatus component, which includes an I2C interface, and a logic circuit having at least one communication address. The logic circuit may be configured to: monitor, via the I2C interface, communications that include a communication address other than the at least one communication address of the logic circuit; and output, via the I2C interface, responses to commands directed to at least one of the at least one communication addresses of the logic circuit, based on at least a portion of the monitored communications.

Figure 14A:
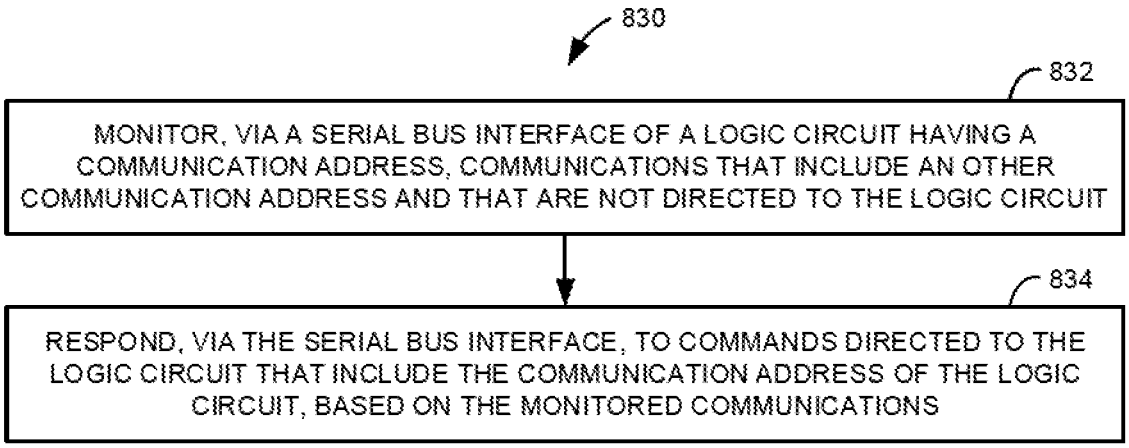
FIGS. 14A-14B are flow diagrams illustrating another example of a method that may be carried out by a logic circuitry package.
Figure 14B:
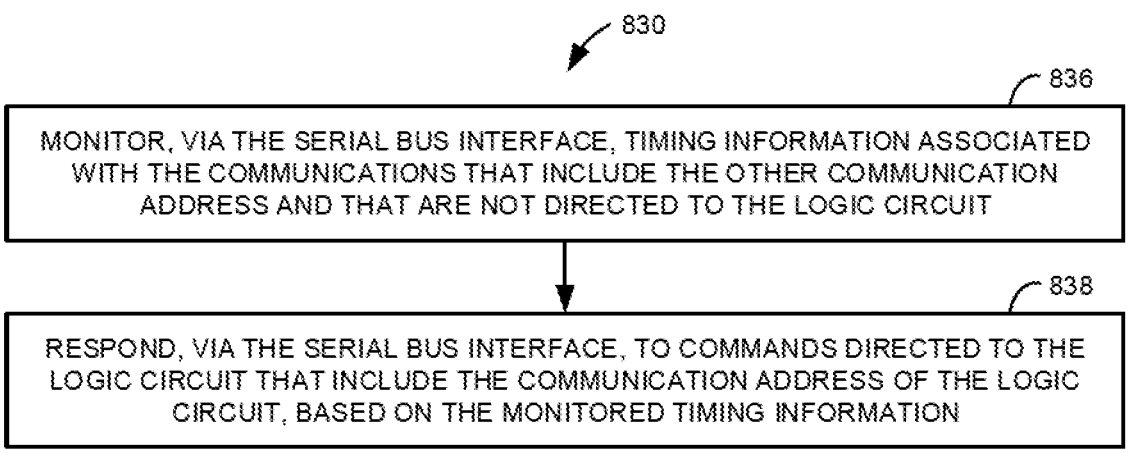

FIGS. 14A-14B are flow diagrams illustrating another example of a method 830 that may be carried out by a logic circuitry package, such as logic circuitry package 400a-400d, or by circuitry 424, 620, 640, 660, or 680. In some examples, as illustrated in FIG. 14A, at 832, method 830 includes monitoring, via a serial bus interface of a logic circuit having a communication address, communications that include an other communication address and that are not directed to the logic circuit. At 834, method 830 includes responding, via the serial bus interface, to commands directed to the logic circuit that include the communication address of the logic circuit, based on the monitored communications.

In some examples, as illustrated in FIG. 14B, at 836, the method 830 may include monitoring, via the serial bus interface, timing information associated with the communications that include the other communication address and that are not directed to the logic circuit. At 838, the method 830 may include responding, via the serial bus interface, to commands directed to the logic circuit that include the communication address of the logic circuit, based on the monitored timing information.

In some examples of method 830, the response to commands directed to the logic circuit may include a response that copies a value specified in the monitored communications, or may include a modified version of a value specified in the monitored communications.

Figure 15A:
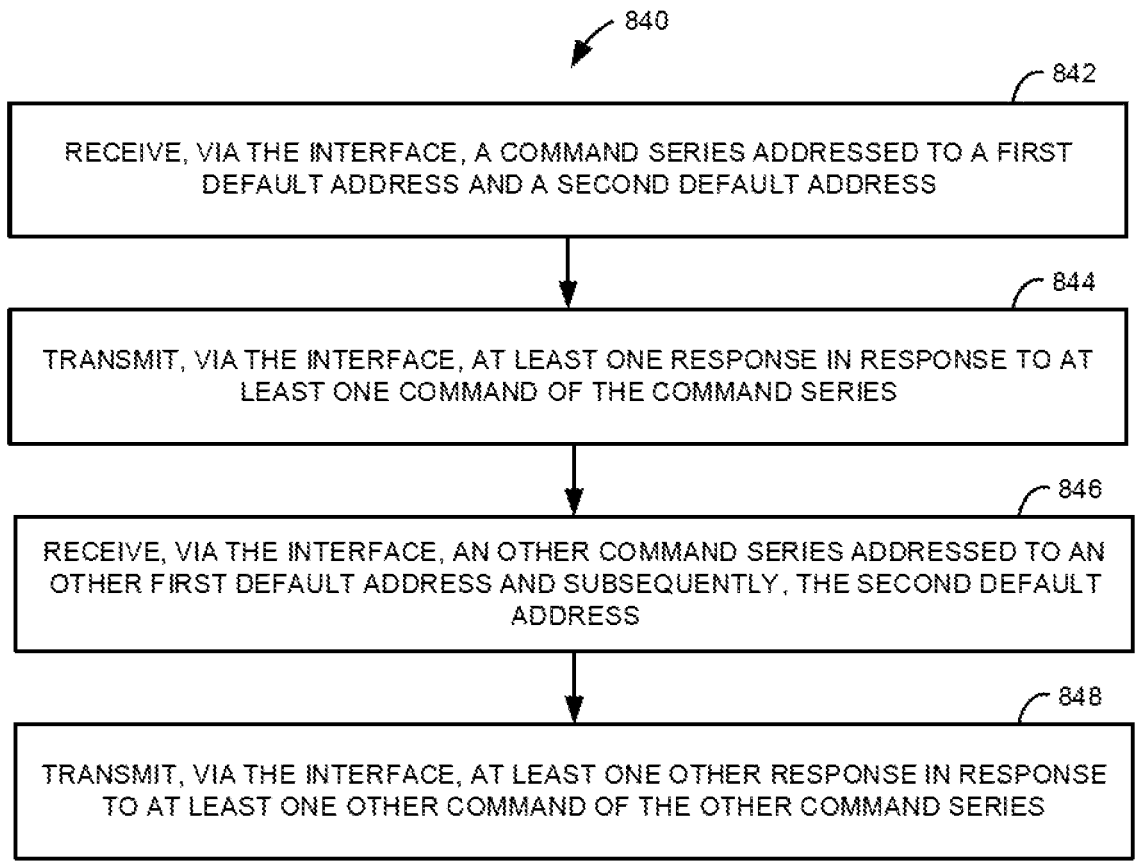
FIGS. 15A-15D are flow diagrams illustrating another example of a method that may be carried out by a logic circuitry package.

FIGS. 15A-15D are flow diagrams illustrating one example of a method 840 that may be carried out by a logic circuitry package, such as logic circuitry package 400a-400d, or by circuitry 424, 620, 640, 660, or 680. Method 840 may be carried out by a logic circuitry package for a print apparatus component that includes an interface to communicate with a print apparatus logic circuit, and at least one logic circuit. As illustrated in FIG. 15A at 842, the at least one logic circuit may receive, via the interface, a command series addressed to a first default address and a second default address. At 844, the at least one logic circuit transmits, via the interface, at least one response in response to at least one command of the command series. At 846, the at least one logic circuit receives, via the interface, an other command series addressed to an other first default address and subsequently, the second default address. At 848, the at least one logic circuit transmits, via the interface, at least one other response in response to at least one other command of the other command series. In some examples, the at least one response includes responses to commands to the second default address, and the at least one other response includes other responses to commands to the second default address.

Figure 15B:
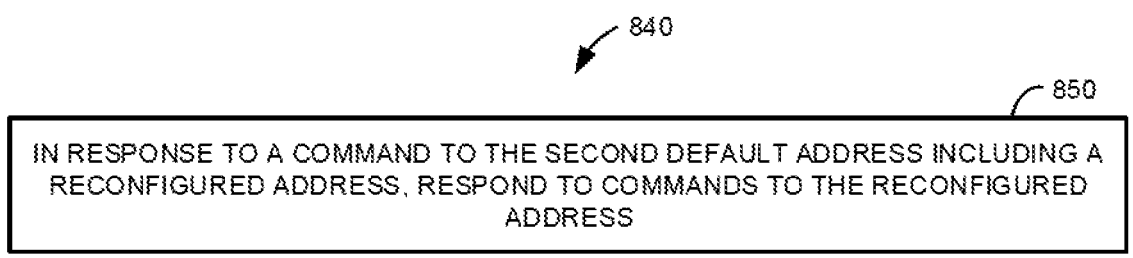

In some examples, as illustrated in FIG. 15B, at 850, the at least one logic circuit in method 840 may, in response to a command to the second default address including a reconfigured address, respond to commands to the reconfigured address.

Figure 15C:
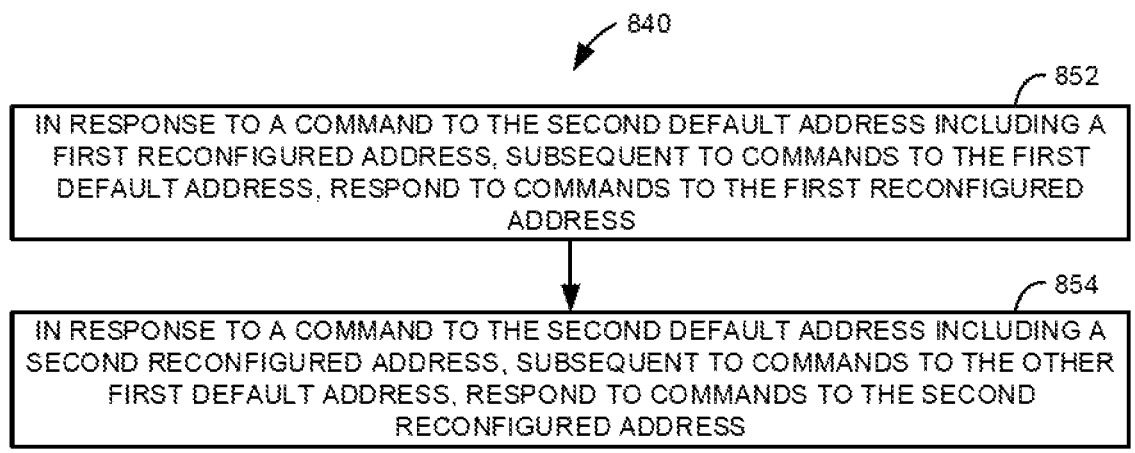

In some examples, as illustrated in FIG. 15C, at 852, the at least one logic circuit in method 840 may, in response to a command to the second default address including a first reconfigured address, subsequent to commands to the first default address, respond to commands to the first reconfigured address. At 854, the at least one logic circuit may, in response to a command to the second default address including a second reconfigured address, subsequent to commands to the other first default address, respond to commands to the second reconfigured address.

In some examples of method 840, the command series includes a time parameter that indicates a time period for responding to commands directed to the second default or first reconfigured address, and the other command series includes an other time parameter that indicates a time period for responding to commands directed to the second default or second reconfigured address. In some examples, the at least one logic circuit is configured to associate the first reconfigured address with the first default address and the second reconfigured address with the other first default address for a remainder of the corresponding time period.

In some examples of method 840, the logic circuitry package includes at least one sensor, and the at least one response and the at least one other response include sensor information from the at least one sensor. The at least one sensor may include one of a liquid sensor to determine a level of liquid in a reservoir, a sensor to detect an effect of a pneumatic stimulus, and a temperature sensor. In some examples, the sensor to detect an effect of the pneumatic stimulus is configured to detect a pneumatic stimulus by a print apparatus to a replaceable print apparatus component through an air port, or an interruption in a communication bitstream frequency. In some examples, the sensor to detect an effect of the pneumatic stimulus is to detect an effect of a pressurization of a replaceable print apparatus component to which the logic circuitry package is attached.

In some examples of method 840, the at least one other response is based at least in part on the at least one response. The command series and the other command series may be a same type of command series, and the at least one other response may copy information from the at least one response. The command series and the other command series may be a same type of command series, and the at least one other response may be modified to be similar but not exactly equal to the at least one response.

Figure 15D:
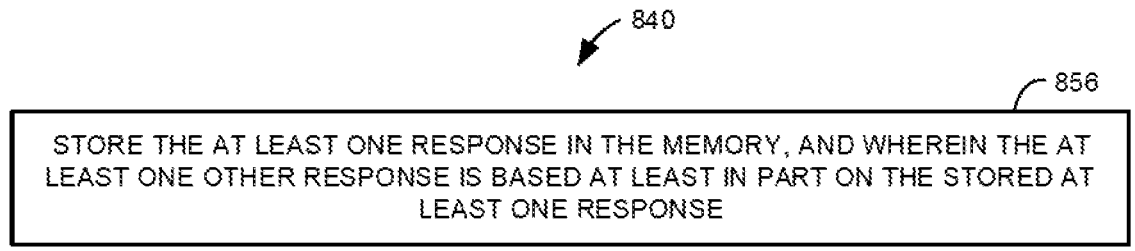

In some examples, the logic circuitry package in method 840 may include a memory, and, as illustrated in FIG. 15D, at 856, the at least one logic circuit in method 840 may store the at least one response in the memory, and the at least one other response may be based at least in part on the stored at least one response.

In some examples of method 840, commands in the command series and the other command series include an I2C address and a register address. The command series and the other command series may each include a set of commands that are cryptographically authenticated using a cryptographic key. The command series and the other command series may each include a subsequent set of commands that are not cryptographically authenticated. The interface may be an I2C interface.

Some examples are directed to a replaceable print apparatus component that includes any of the logic circuitry packages disclosed herein. The logic circuitry package may be connected to the replaceable print apparatus component. The replaceable print apparatus component may include a print material reservoir; and a print material output coupled to the print material reservoir.

The replaceable print apparatus component may further include an air input to connect to a print apparatus air output to receive the pneumatic actuation. The logic circuitry package may include at least one sensor to detect a pneumatic stimulus provided by the print apparatus to the component, wherein the at least one sensor is provided in or on the component. The component may include a pressure structure connected to the air input to pressurize the reservoir upon receiving the pneumatic stimulus from the connected print apparatus. The sensor may detect the effect of the pressurization, and the at least one logic circuit may be configured to condition a digital value output based on a signal of the sensor. The at least one logic circuit may be configured to increase an output count value in response to detecting a presence of an effect of the pneumatic stimulus.

Some examples are directed to a plurality of replaceable print apparatus components including one replaceable print apparatus component of any of the components described herein and one other replaceable print component without a logic circuit to connect to the print apparatus logic circuit, and/or without a logic circuit that responds to the second default address.

Figure 16A:
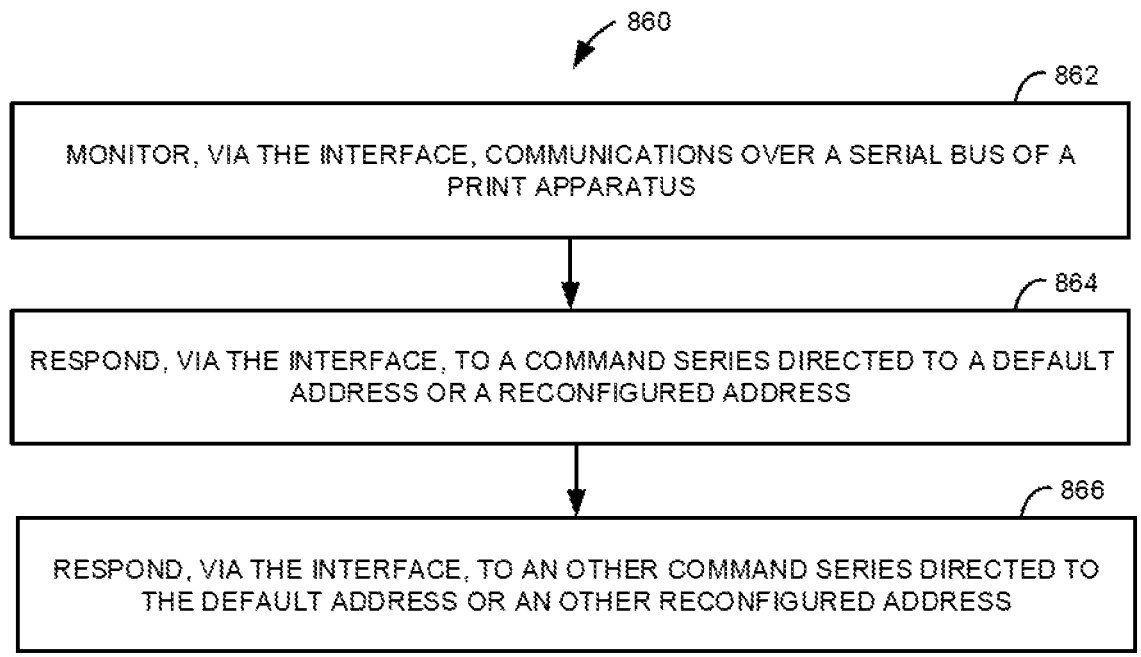
FIGS. 16A-16D are flow diagrams illustrating another example of a method that may be carried out by a logic circuitry package.

FIGS. 16A-16D are flow diagrams illustrating one example of a method 860 that may be carried out by a logic circuitry package, such as logic circuitry package 400*a*-400*d*, or by circuitry 424, 620, 640, 660, or 680. Method 860 may be carried out by a logic circuitry package for a replaceable print apparatus component that includes an interface to communicate with a print apparatus logic circuit, and at least one logic circuit. As illustrated in FIG. 16A at 862, the at least one logic circuit may monitor, via the interface, communications over a serial bus of a print apparatus. At 864, the at least one logic circuit may respond, via the interface, to a command series directed to a default address or a reconfigured address. At 866, the at least one logic circuit may respond, via the interface, to an other command series directed to the default address or an other reconfigured address.

Figure 16B:
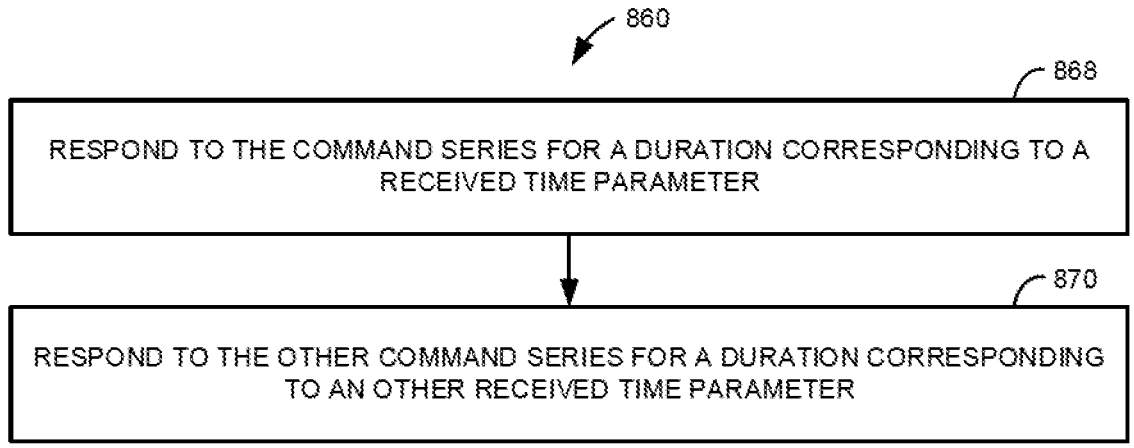

In some examples, as illustrated in FIG. 16B, at 868, the at least one logic circuit in method 860 may, respond to the command series for a duration corresponding to a received time parameter. At 870, the at least one logic circuit may respond to the other command series for a duration corresponding to an other received time parameter.

Figure 16C:
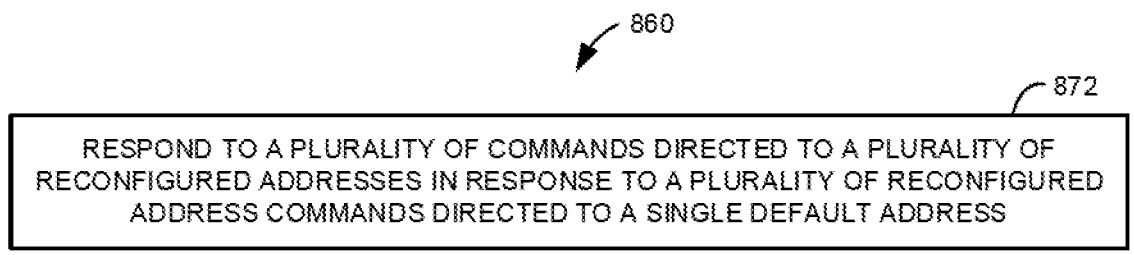

In some examples, as illustrated in FIG. 16C, at 872, the at least one logic circuit in method 860 may respond to a plurality of commands directed to a plurality of reconfigured addresses in response to a plurality of reconfigured address commands directed to a single default address.

Figure 16D:
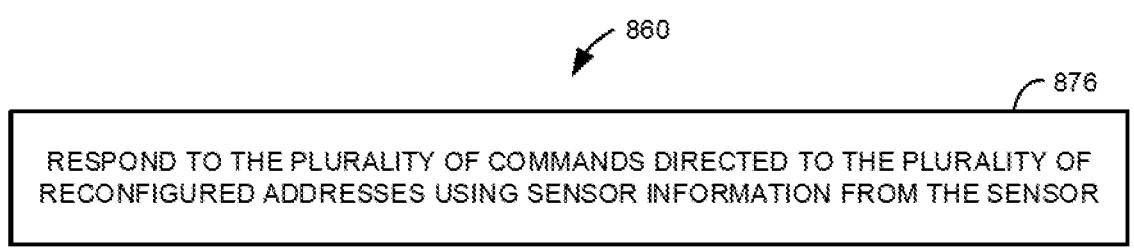

In some examples, the logic circuitry package includes a sensor, and, as illustrated in FIG. 16D, at 876, the at least one logic circuit in method 860 may respond to the plurality of commands directed to the plurality of reconfigured addresses using sensor information from the sensor.

Some examples are directed to a logic circuitry package that includes an I2C interface; a sensor; and a logic circuit, configured to have at least one first default communication address, a second default communication address, and multiple third, temporary communication addresses, and configured to: transmit response information, via the I2C interface, including at least one digital value based on a measured signal of the sensor, in response to each of the multiple third, temporary communication addresses.

Some examples are directed to a replaceable print apparatus component including any of the logic circuitry packages disclosed herein. The replaceable print apparatus component may further include a housing having a height, a width less than the height, and a length greater than the height, the height parallel to a vertical reference axis, and the width extending between two sides; a print liquid reservoir within the housing; and a print liquid output. The replaceable print apparatus component may further include an air input above the print liquid output; and an interface comprising interface pads for communicating with a print apparatus logic circuit, the interface pads provided at an inner side of one of the sides facing a cut-out for a data interconnect to be inserted, the interface pads extending along a height direction near a top and front of the component above the air input, wherein the air input is provided at the front on the same vertical reference axis parallel to the height direction, and wherein the vertical reference axis is parallel to and distanced from an axis that intersects the interface pads.

Figure 17:
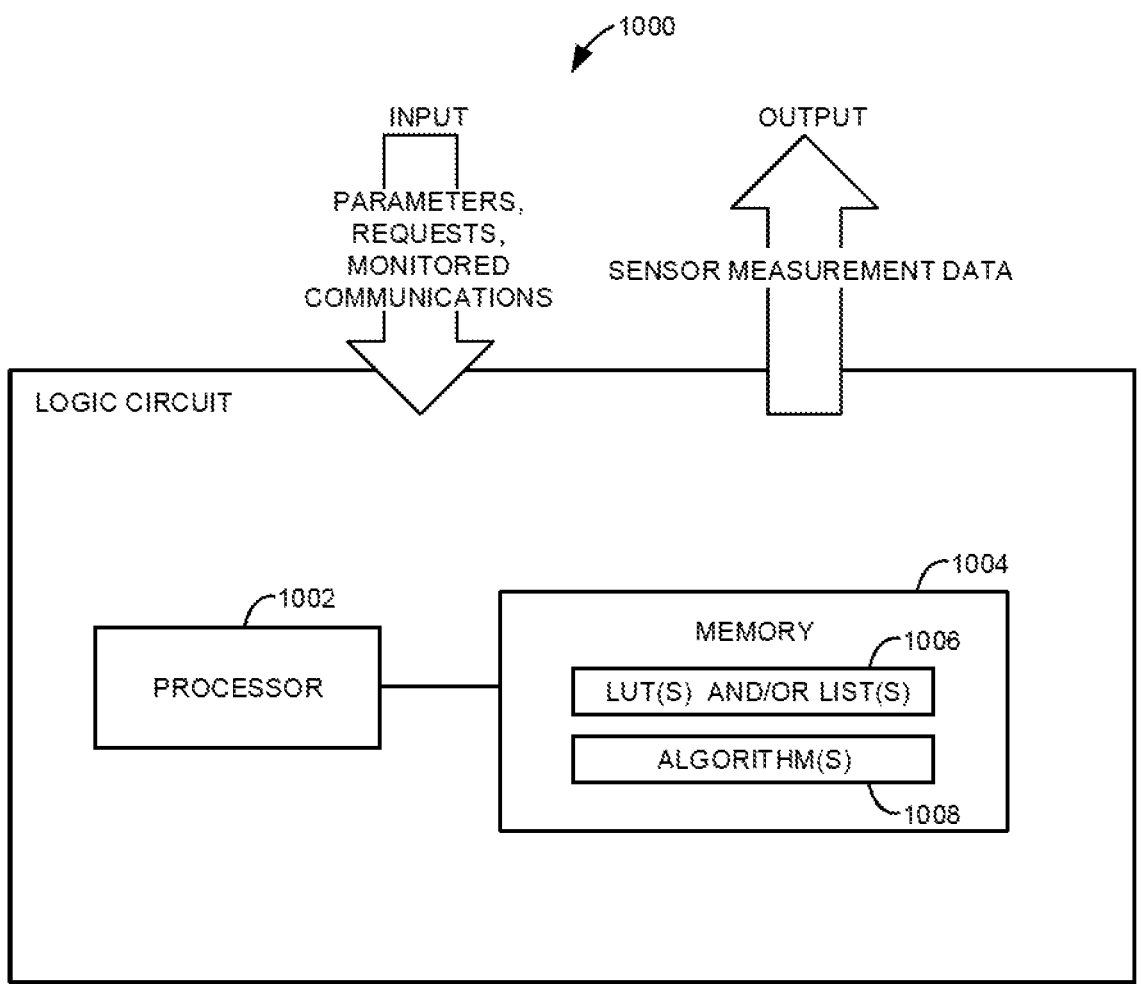
FIG. 17 illustrates another example of a logic circuitry package.

FIG. 17 illustrates another example of a logic circuitry package 1000. FIG. 17 illustrates how the logic circuitry package 1000 may generate a digital output (e.g., sensor measurement data) based on inputs including parameters and/or requests (e.g., to request sensor measurements; sensor IDs; etc.), and monitored communications, sent digitally by a print apparatus or another replaceable print apparatus component. Logic circuitry package 1000 includes a logic circuit with a processor 1002 communicatively coupled to a memory 1004. Memory 1004 may store look up table(s) and/or list(s) 1006 and/or algorithm(s) 1008. Logic circuitry package 1000 may also include any of the features of logic circuitry packages 400*a*-400*d* or circuitry 424, 620, 640, 660, and/or 680 as previously described.

The logic circuitry package 1000 may consult monitored communications, in combination with the LUT(s)/list(s) 1006 and/or algorithm(s) 1008, to generate the digital output. The monitored communications may include communications related to a sensor to detect an effect of a pneumatic actuation of the print apparatus upon the replaceable print component, and/or a sensor to detect an approximate temperature, and/or other sensors. The logic circuitry package 1000 may monitor communications involving a plurality of sensors of different types, for example, at least two sensors of different types, and may output digital values based on the monitored communications.

The output values may be generated using the LUT(s) and or list(s) 1006 and/or algorithm(s) 1008 whereby the requests, parameters, and monitored communications may be used as input.

The example logic circuitry package 1000 may be used as an alternative to the complex thin film sensor arrays addressed elsewhere in this disclosure. The example logic circuitry package 1000 may be configured to generate outputs that are validated by the same print apparatus logic circuit designed to be compatible with the complex sensor array packages. The alternative package 1000 may be cheaper or simpler to manufacture, or simply be used as an alternative to the earlier mentioned packages, for example to facilitate printing and validation by the print apparatus.

Logic circuitry package 1000 may be implemented in a replaceable print apparatus component and may be configured to monitor communications between a print apparatus logic circuit and an other replaceable print apparatus component. When the logic circuitry package 1000 receives a request from the print apparatus logic circuit to provide sensor information, the logic circuitry package 1000 may use the monitored communications to respond with the same response or a similar response as the other replaceable print apparatus component.

Logic circuitry package 1000 may monitor an I2C bus for commands directed to I2C addresses other than its own address, as well as responses to those commands. In response to commands directed to the I2C address of the logic circuitry package 1000, the package 1000 may mimic previously monitored responses, or provide a pre-stored response sequence upon detecting a specific command. The logic circuitry package 1000 may also monitor the timing of responses from other components, and repeat that timing in responses provided by the logic circuitry package 1000.

Logic circuitry package 1000 may be implemented in a replaceable print apparatus component and may be configured to respond to commands addressed to the replaceable print apparatus component, and respond to commands addressed to at least one other replaceable print apparatus component.

Logic circuitry package 1000 may be implemented in a replaceable print apparatus component and may be configured to monitor an I2C bus for commands addressed to a replaceable print apparatus component having a sensor, as well as responses to those commands. In response to commands addressed to the logic circuitry package 1000, and in response to commands addressed to at least one further replaceable print apparatus component, the logic circuitry package 1000 may copy monitored responses from the replaceable print apparatus component with the sensor.

Some examples of logic circuitry packages described herein may be applied either to a print apparatus permanently, or to a replaceable print apparatus component permanently. The packages may be applied to the data connect of the receiving station or the cartridge. A print apparatus component, as used herein, can be any replaceable or non-replaceable component of a print apparatus.

In some examples, the logic circuitry package does not respond to commands directed to the first default address because those commands are handled by a secure microcontroller. Each replaceable print apparatus component in a print apparatus may have its own such secure microcontroller. Commands handled by the logic circuitry package may be preceded by a command to the first default address, which is the address of the secure microcontroller.

Some examples disclosed herein provide an alternative to replaceable print apparatus components with complex sensor circuitry, and some of the replaceable print apparatus components may have no circuitry, or less complex circuitry than other replaceable print apparatus components. Some examples provide more flexibility and a reduction of costs. For example, one logic circuitry package can be made more robust at less cost than multiple logic circuitry packages. The cost of including a microcontroller and/or sensors in every supply for detecting hyperinflation, low ink level, and ink temperature can be avoided. In some examples, sensors and circuitry can be completely avoided in some supplies.

In one example, the logic circuitry packages described herein mainly include hardwired routings, connections, and interfaces between different components. In another example, the logic circuitry packages may also include at least one wireless connection, wireless communication path, or wireless interface, for internal and/or external signaling, whereby a wirelessly connected element may be considered as included in the logic circuitry package and/or replaceable component. For example, certain sensors may be wireless connected to communicate wirelessly to the logic circuit/sensor circuit. For example, sensors such as pressure sensors and/or print material level sensors may communicate wirelessly with other portions of the logic circuit. These elements, which communicate wirelessly with the rest of the logic circuit, may be considered part of the logic circuit or logic circuitry package. Also, the external interface of the logic circuitry package, to communicate with the print apparatus logic circuit, may include a wireless interface. Also, while reference may be made to power routings, power interfaces, or charging or powering certain cells, certain examples of this disclosure may include a power source such as a battery or a power harvesting source that may harvest power from data or clock signals.

Certain example circuits of this disclosure relate to outputs that vary in a certain way in response to certain commands, events and/or states. It is also explained that, unless calibrated in advance, responses to these same events and/or states may be "clipped", for example so that they cannot be characterized or are not relatable to these commands, events and/or states. For these example circuits where the output needs to be calibrated to obtain the characterizable or relatable output, it should be understood that also before required calibration (or installation) occurred these circuits are in fact already "configured" to provide for the characterizable output, that is, all means are present to provide for the characterizable output, even where calibration is yet to occur. It may be a matter of choice to calibrate a logic circuit during manufacture and/or during customer installation and/or during printing, but this does not take away that the same circuit is already "configured" to function in the calibrated state. For example, when sensors are mounted to a reservoir wall, certain strains in that wall over the lifetime of the component may vary and may be difficult to predict while at the same time these unpredictable strains affect the output of the logic circuit. Different other circumstances such as conductivity of the print material, different packaging, in-assembly-line-mounting, etc. may also influence how the logic circuit responds to commands/events/states so that a choice may be made to calibrate at or after a first customer installation. In any of these and other examples, it is advantageous to determine (operational) calibration parameters in-situ, after first customer installation and/or between print jobs, whereby, again, these should be considered as already adapted to function in a calibrated state. Certain alternative (at least partly) "virtual" embodiments discussed in this disclosure may operate with LUTs or algorithms, which may similarly generate, before calibration or installation, clipped values, and after calibration or installation, characterizable values whereby such alternative embodiment, should also be considered as already configured or adapted to provide for the characterizable output, even before calibration/installation.

In one example, the logic circuitry package outputs count values in response to read requests. In many examples, the output of count values is discussed. In certain examples, each separate count value is output in response to each read request. In another example, a logic circuit is configured to output a series or plurality of count values in response to a single read request. In other examples, output may be generated without a read request.

Each of the logic circuitry packages 400a-400d, 1000 described herein may have any feature of any other logic circuitry packages 400a-400d, 1000 described herein or of the circuitry 424, 620, 640, 660, 680. Any logic circuitry packages 400a-400d, 1000 or the circuitry 424, 620, 640, 660, 680 may be configured to carry out at least one method block of the methods described herein. Any first logic circuit may have any attribute of any second logic circuit, and vice versa.

Examples in the present disclosure can be provided as methods, systems or machine readable instructions, such as any combination of software, hardware, firmware or the like. Such machine readable instructions may be included on a machine readable storage medium (including but not limited to disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus, functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a machine readable storage (e.g., a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, "a" or "an" does not exclude a plurality, and a single processor or other unit may fulfil the functions of several units recited in the claims.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A logic circuitry package for a print apparatus component comprising an interface to communicate with a print apparatus logic circuit, and at least one logic circuit configured to:
   receive, via the interface, a command series addressed to a first default address and a second default address;
   transmit, via the interface, at least one response in response to at least one command of the command series;
   receive, via the interface, an other command series addressed to an other first default address and subsequently, the second default address; and
   transmit, via the interface, at least one other response in response to at least one other command of the other command series.

2. The logic circuitry package of claim 1, wherein:
   the at least one response includes responses to commands to the second default address, and
   the at least one other response includes other responses to commands to the second default address.

3. The logic circuitry package of claim 1, wherein the at least one logic circuit is configured to:
   in response to a command to the second default address including a reconfigured address, respond to commands to the reconfigured address.

4. The logic circuitry package of claim 1, wherein the at least one logic circuit is configured to:
   in response to a command to the second default address including a first reconfigured address, subsequent to commands to the first default address, respond to commands to the first reconfigured address; and
   in response to a command to the second default address including a second reconfigured address, subsequent to commands to the other first default address, respond to commands to the second reconfigured address.

5. The logic circuitry package of claim 4, wherein the command series includes a time parameter that indicates a time period for responding to commands directed to the second default or first reconfigured address, and wherein the other command series includes an other time parameter that indicates a time period for responding to commands directed to the second default or second reconfigured address.

6. The logic circuitry package of claim 5, wherein the at least one logic circuit is configured to associate the first reconfigured address with the first default address and the second reconfigured address with the other first default address for a remainder of the corresponding time period.

7. The logic circuitry package of claim 1, and further comprising at least one sensor, and wherein the at least one response and the at least one other response include sensor information from the at least one sensor.

8. The logic circuitry package of claim 7, wherein the at least one sensor includes one of
a liquid sensor to determine a level of liquid in a reservoir,
a sensor to detect an effect of a pneumatic stimulus, and
a temperature sensor.

9. The logic circuitry package of claim 8, wherein the sensor to detect an effect of the pneumatic stimulus is configured to detect
a pneumatic stimulus by a print apparatus to a replaceable print apparatus component through an air port, or
an interruption in a communication bitstream frequency.

10. The logic circuitry package of claim 8, wherein the sensor to detect an effect of the pneumatic stimulus is to detect an effect of a pressurization of a replaceable print apparatus component to which the logic circuitry package is attached.

11. The logic circuitry package of claim 1, wherein the at least one other response is based at least in part on the at least one response.

12. The logic circuitry package of claim 1, wherein the command series and the other command series are a same type of command series, and wherein the at least one other response copies information from the at least one response.

13. The logic circuitry package of claim 1, wherein the command series and the other command series are a same type of command series, and wherein the at least one other response is modified to be similar but not exactly equal to the at least one response.

14. The logic circuitry package of claim 1, wherein the logic circuitry package comprises a memory, and wherein the at least one logic circuit is configured to:
store the at least one response in the memory, and wherein the at least one other response is based at least in part on the stored at least one response.

15. The logic circuitry package of claim 1, wherein commands in the command series and the other command series include an I2C address and a register address.

16. The logic circuitry package of claim 1, wherein the command series and the other command series each include a set of commands that are cryptographically authenticated using a cryptographic key.

17. The logic circuitry package of claim 16, wherein the command series and the other command series each include a subsequent set of commands that are not cryptographically authenticated.

18. The logic circuitry package of claim 1, wherein the interface is an I2C interface.

19. A logic circuitry package for a replaceable print apparatus component comprising an interface to communicate with a print apparatus logic circuit, and at least one logic circuit configured to:
monitor, via the interface, communications over a serial bus of a print apparatus;
respond, via the interface, to a command series directed to a default address or a reconfigured address; and
respond, via the interface, to an other command series directed to the default address or an other reconfigured address.

20. The logic circuitry package of claim 19, wherein the at least one logic circuit is configured to:
respond to the command series for a duration corresponding to a received time parameter; and
respond to the other command series for a duration corresponding to an other received time parameter.

21. The logic circuitry package of claim 19, wherein the at least one logic circuit is configured to:
respond to a plurality of commands directed to a plurality of reconfigured addresses in response to a plurality of reconfigured address commands directed to a single default address.

22. The logic circuitry package of claim 21, and further comprising a sensor, and wherein the at least one logic circuit is configured to:
respond to the plurality of commands directed to the plurality of reconfigured addresses using sensor information from the sensor.

23. A logic circuitry package, comprising:
an I2C interface;
a sensor;
a logic circuit, configured to have at least one first default communication address, a second default communication address, and multiple third, temporary communication addresses, and configured to:
transmit response information, via the I2C interface, including at least one digital value based on a measured signal of the sensor, in response to each of the multiple third, temporary communication addresses.

* * * * *